United States Patent
Kurata et al.

(10) Patent No.: US 12,111,730 B2
(45) Date of Patent: Oct. 8, 2024

(54) STORAGE SYSTEM AND FAILURE HANDLING METHOD

(71) Applicant: Hitachi, Ltd., Tokyo (JP)

(72) Inventors: Naruki Kurata, Tokyo (JP); Takahiro Yamamoto, Tokyo (JP); Takaki Nakamura, Tokyo (JP); Hideo Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/946,632

(22) Filed: Sep. 16, 2022

(65) Prior Publication Data

US 2023/0350753 A1 Nov. 2, 2023

(30) Foreign Application Priority Data

Apr. 28, 2022 (JP) .................................. 2022-074093

(51) Int. Cl.
| | | |
|---|---|---|
| *G06F 11/10* | (2006.01) | |
| *G06F 3/06* | (2006.01) | |
| *G06F 11/07* | (2006.01) | |

(52) U.S. Cl.
CPC ........ *G06F 11/1092* (2013.01); *G06F 3/0619* (2013.01); *G06F 3/0631* (2013.01); *G06F 3/067* (2013.01); *G06F 11/0772* (2013.01)

(58) Field of Classification Search
CPC ............. G06F 11/1092; G06F 11/0772; G06F 3/0631; G06F 3/067; G06F 3/0619
See application file for complete search history.

(56) References Cited

U.S. PATENT DOCUMENTS

| | | | |
|---|---|---|---|
| 9,645,943 B2 * | 5/2017 | Kopylovitz | ............. G06F 3/061 |
| 10,083,100 B1 | 9/2018 | Agetsuma et al. | |
| 11,442,652 B1 * | 9/2022 | Dailey | ................. G06F 3/0647 |

(Continued)

FOREIGN PATENT DOCUMENTS

| | | |
|---|---|---|
| JP | 2009-140153 A | 6/2009 |
| JP | 2019-101703 A | 6/2019 |
| JP | 2020-021277 A | 2/2020 |

OTHER PUBLICATIONS

Japanese Office Action received in Application No. 2022-074093, dated Apr. 2, 2024, in 6 pages (with translation).

*Primary Examiner* — Samir W Rizk
(74) *Attorney, Agent, or Firm* — Procopio, Cory, Hargreaves & Savitch LLP

(57) ABSTRACT

Proposed are a storage system and a failure handling method capable of quickly recovering from a degeneration configuration when a failure occurs while reducing a cost required for system construction. A storage system is provided with one or a plurality of storage devices provided in a cloud system, one or a plurality of storage nodes provided in the cloud system, and a cloud control device configured to control the cloud system. The storage node is configured to request the cloud control device to prepare a new storage node when a failure of another storage node is detected, determine whether the storage device allocated to the storage node in which the failure occurs is failed, and request the cloud control device to allocate the storage device allocated to the storage node in which the failure occurs to the new storage node when the storage device is determined to be not failed.

12 Claims, 18 Drawing Sheets

(56) References Cited

U.S. PATENT DOCUMENTS

| | | | |
|---|---|---|---|
| 11,789,638 B2* | 10/2023 | Dailey | G06F 3/0635 |
| | | | 711/154 |
| 2009/0150629 A1 | 6/2009 | Noguchi et al. | |
| 2013/0332700 A1* | 12/2013 | Kopylovitz | G06F 3/0631 |
| | | | 711/209 |
| 2015/0244792 A1* | 8/2015 | Bailey | H04L 41/5003 |
| | | | 715/736 |
| 2020/0042416 A1 | 2/2020 | Satoyama et al. | |
| 2022/0030062 A1* | 1/2022 | Jennings | H04L 69/16 |
| 2023/0308853 A1* | 9/2023 | Ding | H04W 4/40 |
| 2023/0345543 A1* | 10/2023 | Tang | H04W 72/231 |
| 2023/0350753 A1* | 11/2023 | Kurata | G06F 3/0619 |
| 2023/0354152 A1* | 11/2023 | Bangolae | H04W 40/22 |
| 2023/0389125 A1* | 11/2023 | Islam | H04W 52/0229 |

\* cited by examiner

FIG. 4

CHUNK MANAGEMENT TABLE 34

| CHUNK NUMBER | BELONGING NODE NUMBER | STORAGE DEVICE NUMBER | STORAGE DEVICE OFFSET | CAPACITY |
|---|---|---|---|---|
| 0 | 0 | 0 | 0x00000 | 0x10000 |
| 1 | 0 | 0 | 0x10000 | 0x10000 |
| 2 | 0 | 0 | 0x20000 | 0x10000 |
| 3 | 0 | 1 | 0x00000 | 0x10000 |
| 4 | 1 | 2 | 0x00000 | 0x10000 |
| 5 | 1 | 2 | 0x10000 | 0x10000 |
| 6 | 2 | 3 | 0x00000 | 0x10000 |
| 7 | 2 | 3 | 0x10000 | 0x10000 |
| ... | ... | ... | ... | ... |
| 34A | 34B | 34C | 34D | 34E |

FIG. 5

CHUNK GROUP MANAGEMENT TABLE 35

| CHUNK GROUP NUMBER | FIRST CHUNK NUMBER | SECOND CHUNK NUMBER | THIRD CHUNK NUMBER |
|---|---|---|---|
| 0 | 0 | 4 | 6 |
| 1 | 1 | 5 | 7 |
| 2 | 2 | 8 | 10 |
| ... | ... | ... | ... |

CHUNK UPDATE MANAGEMENT BITMAP TABLE 36

| CHUNK NUMBER | UPDATE MANAGEMENT BITMAP |
|---|---|
| 0 | 0011000001··· |
| 1 | ··· |
| 2 | ··· |
| 3 | ··· |
| 4 | ··· |
| 5 | ··· |

36A     36B

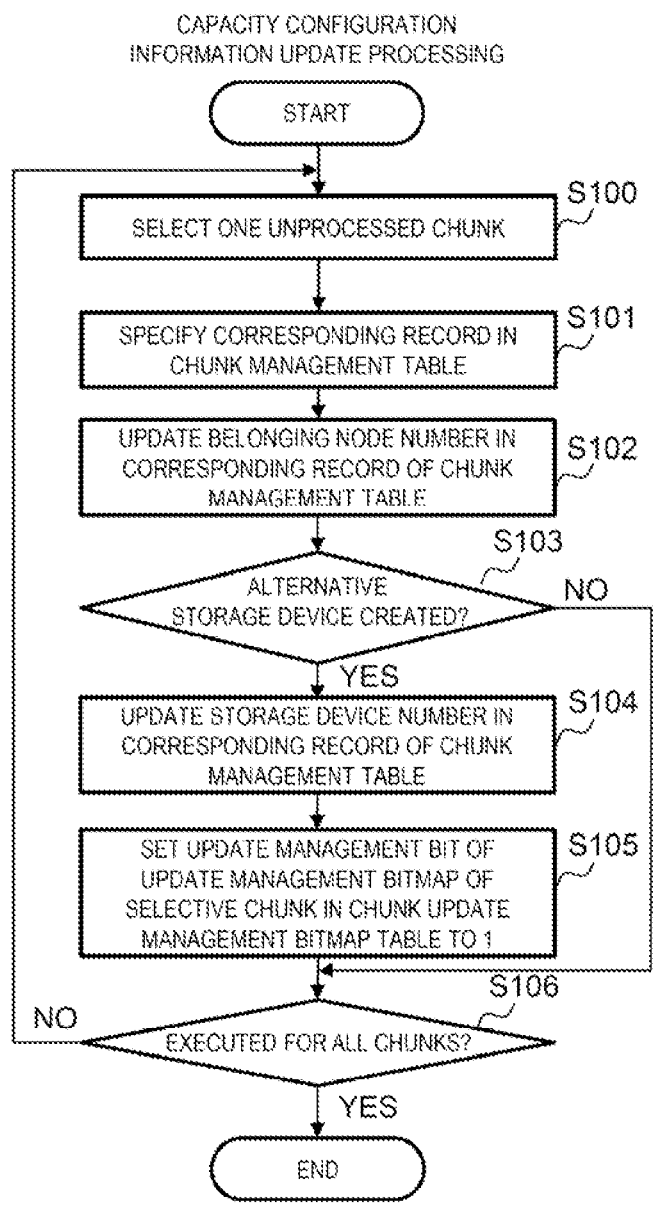

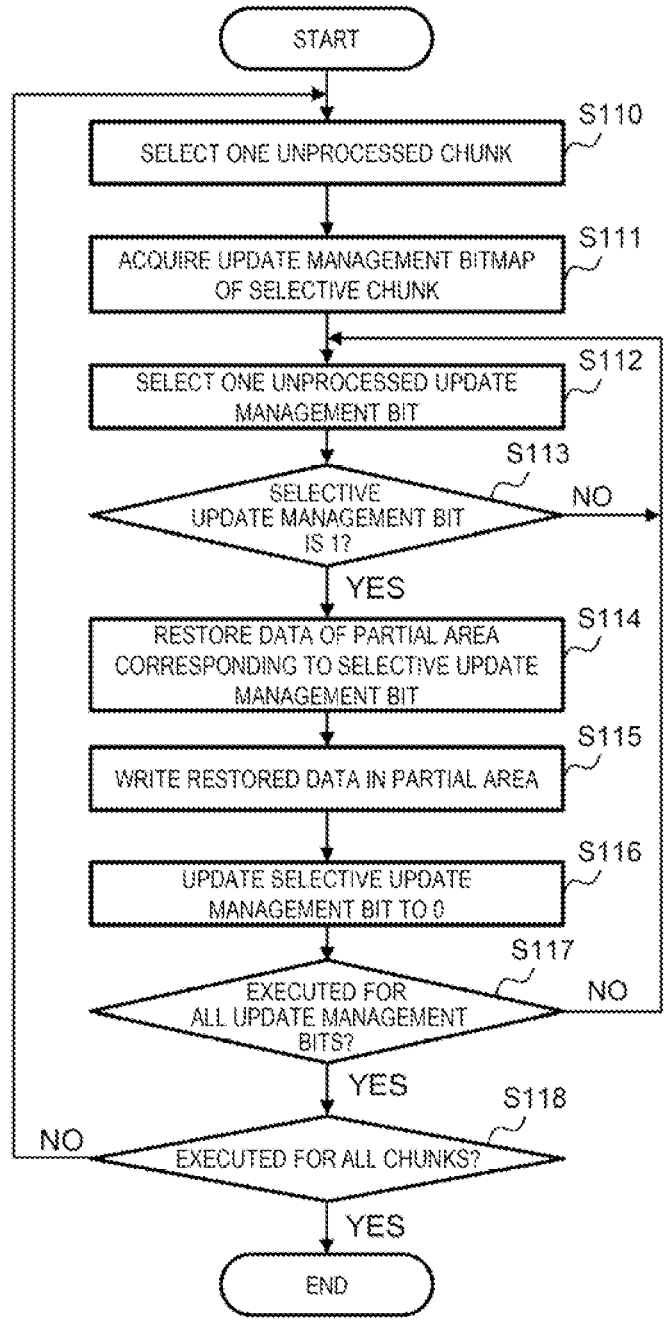

STORAGE SYSTEM AND FAILURE HANDLING METHOD

BACKGROUND OF THE INVENTION

1. Field of the Invention

The present invention relates to a storage system and a failure handling method, and is suitably applied to, for example, a storage system including a plurality of storage nodes on which one or a plurality of software defined storages (SDS) are implemented. In the following, SDS refers to a storage device implemented by installing software having a storage function into a general-purpose server device.

2. Description of the Related Art

In the related art, in an information processing system, a redundant configuration of a server device is often implemented in order to improve availability and reliability. For example, JP-A-2019-101703 proposes a failover method for SDS storage control software.

Specifically, in JP-A-2019-101703, a pair of control software for implementing failover include active side control software (hereinafter, referred to as active control software) that operates in a normal state and standby side control software (hereinafter, referred to as standby control software) that takes over processing from the active control software when a failure occurs, and the active control software and the standby control software that constitute the same pair are disposed in different server devices. The active control software and the standby control software that constitute the same pair store the same control information, and always update the control information synchronously.

According to such a technique, since reading processing of the control information can be closed in a server while maintaining reliability of an entire system, there is an advantage that high performance can be achieved.

Meanwhile, in recent years, a cloud (in particular, a public cloud) is becoming widespread as a platform of an information processing system. In such a public cloud, a public cloud vendor develops services that provide computer resources and storage resources as infrastructure as a service (IaaS).

Public cloud users can access the computer services and the storage services on the public cloud through an application programming interface (API), can secure a required amount of computer resources and storage resources at a required timing, and can change configurations of the computer resources and the storage resources quickly.

When maintenance of reliability and performance of a distributed storage system as a whole is taken into consideration, it is common to dispose a spare server device in an on-premises environment including an environment presupposed in JP-A-2019-101703 in order to quickly recover from a degeneration configuration triggered by a failure of the server device. In general, a storage device is attached to the spare server device in advance, and when recovering from the failure, data is written back to the storage device to recover from the degeneration configuration.

However, in order to prepare the spare server device in advance in this way, a cost for the preparation is required, and there is a problem that introduction or construction of the distributed storage system requires a large amount of cost. In addition, in order to recover from the degeneration configuration, it takes a considerable amount of time since it is necessary to copy data from the server device in which a failure occurs as described above to the storage device connected to the spare server device, which hinders quick recovery.

SUMMARY OF THE INVENTION

The invention is made in view of the above points, and an object thereof is to propose a storage system and a failure handling method capable of quickly recovering from a degeneration configuration when a failure occurs while reducing a cost required for system construction.

According to the invention for solving such a problem, there is provided a storage system for providing a storage area to a higher-level device. The storage system includes: one or a plurality of storage devices provided in a cloud system, and configured to provide the storage area; one or a plurality of storage nodes provided in the cloud system, and configured to read and write data from and to the storage device allocated to the storage nodes themselves in response to a request from the higher-level device; and a cloud control device configured to control the cloud system. The storage node is configured to request the cloud control device to prepare a new storage node when a failure of another storage node is detected, determine whether the storage device allocated to the storage node in which the failure occurs is failed, and request the cloud control device to allocate the storage device allocated to the storage node in which the failure occurs to the new storage node when the storage device is determined to be not failed.

According to the invention, there is provided a failure handling method in a storage system for providing a storage area to a higher-level device. The storage system includes one or a plurality of storage devices provided in a cloud system, and configured to provide the storage area, one or a plurality of storage nodes provided in the cloud system, and configured to read and write data from and to the storage device allocated to the storage nodes themselves in response to a request from the higher-level device, and a cloud control device configured to control the cloud system. The failure handling method includes: a first step of requesting, by the storage node, the cloud control device to prepare a new storage node when a failure of another storage node is detected; a second step of determining, by the storage node, whether the storage device allocated to the storage node in which the failure occurs is failed; and a third step of requesting, by the storage node, the cloud control device to allocate the storage device allocated to the storage node in which the failure occurs to the new storage node when the storage device is determined to be not failed.

According to the storage system and the failure handling method of the invention, it is not necessary for a user to prepare spare computer resources or storage resources in advance when constructing a distributed storage system, and thus a storage system can be constructed inexpensively from a user's point of view. It is not necessary to copy the data stored in the storage device allocated to the storage node in which the failure occurs to, for example, the storage device allocated to the new storage node, and thus it is possible to quickly recover from a degeneration configuration when a failure occurs.

According to the invention, it is possible to implement the storage system and the failure handling method capable of quickly recovering from the degeneration configuration when a failure occurs while reducing a cost required for system construction.

BRIEF DESCRIPTION OF THE DRAWINGS

FIG. 4 is a chart illustrating a configuration of a chunk management table.

FIG. 5 is a chart illustrating a configuration of a chunk group management table.

FIG. 6 is a chart illustrating a configuration of a chunk update management bitmap table.

FIG. 17 is a flowchart illustrating a processing procedure of configuration information update processing.

FIG. 18 is a flowchart illustrating a processing procedure of the rebuild processing.

DESCRIPTION OF THE PREFERRED EMBODIMENTS

Figure 1:
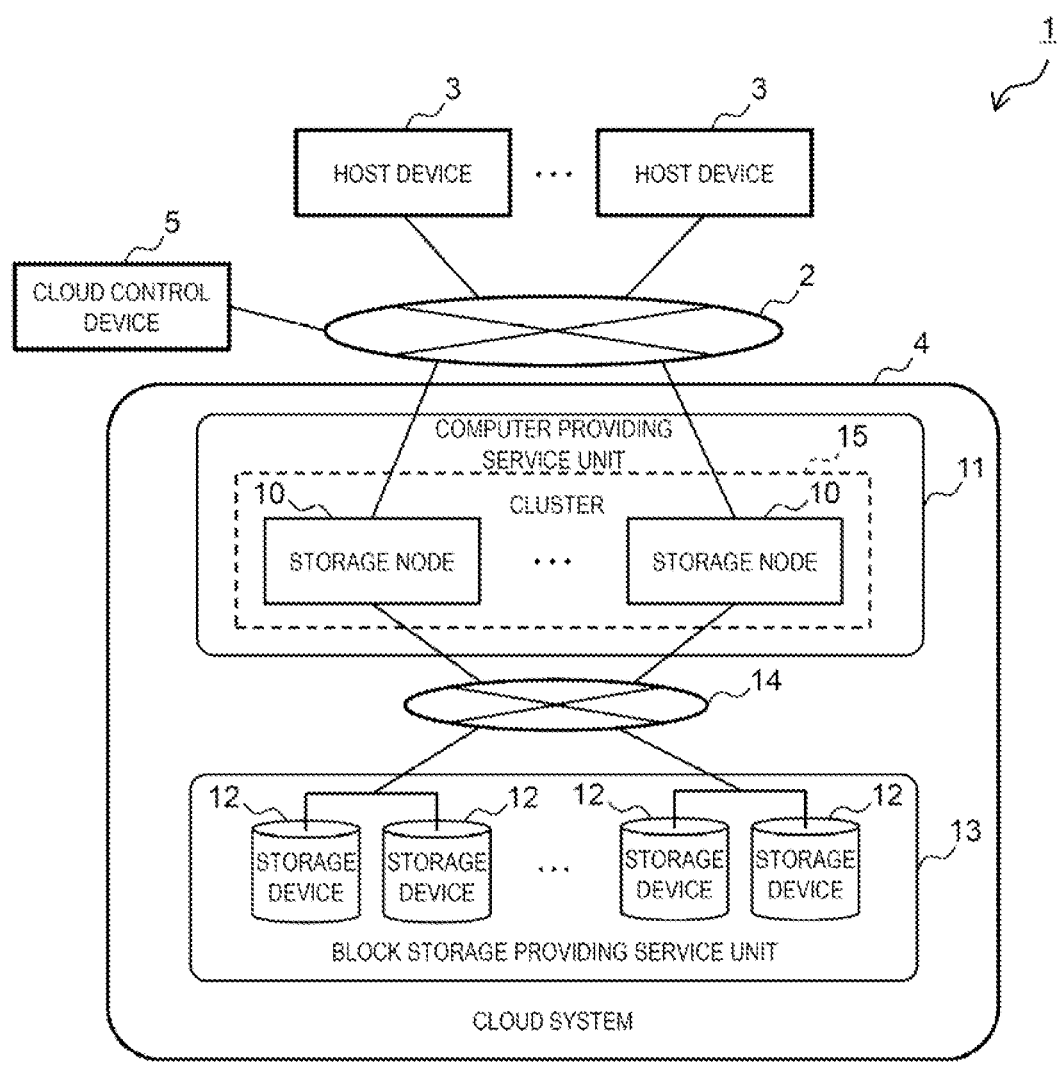
FIG. 1 is a block diagram illustrating an overall configuration of a storage system according to the present embodiment.

Hereinafter, an embodiment of the invention will be described in detail with reference to the drawings. The following description and drawings are examples for use in describing the invention, and do not limit the technical scope of the invention. In the drawings, common components are denoted by the same reference numerals.

In the following description, although various types of information may be described in terms of expressions such as "table", "chart", "list", and "queue", the various types of information may be expressed by other data structures. "XX table", "XX list", and the like may be referred to as "XX information" to indicate that the information does not depend on the data structure. When describing a content of each piece of information, expressions such as "identification information", "identifier", "name", "ID", and "number" are used, but these expressions may be replaced with each other.

In the following description, when the same kind of elements are not distinguished from each other, a reference numeral or a common number in the reference numeral is used, and when the same kind of elements are distinguished, the reference numeral of the element may be used, or an ID allocated to the element may be used instead of the reference numeral.

In the following description, processing executed by executing a program may be described, whereas the program is executed by at least one or more processors (for example, a CPU) to execute predetermined processing while using a storage resource (for example, a memory) and/or an interface device (for example, a communication port), or the like as appropriate, and thus a subject of the processing may be the processor. Similarly, the subject of the processing executed by executing the program may be a controller, a device, a system, a computer, a node, a storage system, a storage device, a server, a management computer, a client, or a host which includes the processor. The subject of the processing (for example, the processor) executed by executing the program may include a hardware circuit that executes a part or all of the processing. For example, the subject of the processing executed by executing the program may include a hardware circuit that executes encryption and decryption, or compression and decompression. The processor operates as a functional unit that implements a predetermined function by operating according to the program. A device and a system including the processor are a device and a system including the functional unit.

The program may be installed from a program source into a device such as the computer. The program source may be, for example, a program distribution server or a computer readable storage medium. When the program source is the program distribution server, the program distribution server may include the processor (for example, a CPU) and the storage resource, and the storage resource may further store a distribution program and a program to be distributed. The processor of the program distribution server may distribute the program to be distributed to other computers by executing the distribution program. In the following description, two or more programs may be implemented as one program, or one program may be implemented as two or more programs.

(1) Outline of Storage System According to Present Embodiment

In FIG. 1, a reference numeral 1 illustrates a storage system according to the present embodiment as a whole. The storage system 1 includes a plurality of host devices 3, a cloud system 4, and a cloud control device 5, which are connected to each other via a network 2 including, for example, Ethernet (a registered trademark) or a local area network (LAN).

The host device 3 is a higher-level device that transmits a read request or a write request (hereinafter, these are collectively referred to as an Input/Output (I/O) request as appropriate) to a storage node 10, which will be described later, in the cloud system 4 in response to a user operation or a request from an implemented application program, and includes a general-purpose computer device. The host device 3 may be a physical computer device or a virtual computer device such as a virtual machine. Further, the host device 3 may be incorporated in the cloud system 4.

The cloud system 4 includes a computer providing service unit 11 including a plurality of storage nodes 10 and a block storage providing service unit 13 including a plurality of storage devices 12. The storage nodes 10 constituting the computer providing service unit 11 and the storage devices 12 constituting the block storage providing service unit 13 are connected to each other via a network 14 for a block storage providing service.

The storage node 10 is a physical or virtual server device that provides a storage area for reading and writing from and to the host device 3. In practice, one or a plurality of storage devices 12 in the block storage providing service unit 13 are allocated to the storage node 10. The storage node 10 virtualizes the storage area provided by the allocated storage device 12 and provides the virtual storage area to the host device 3.

Figure 2:
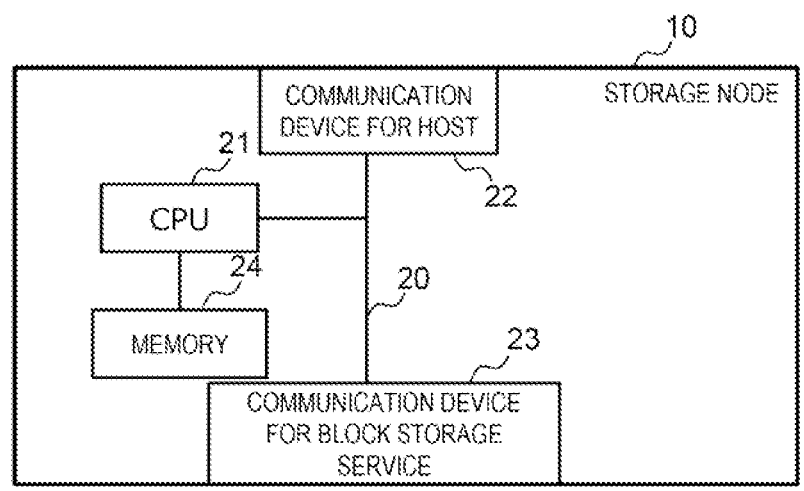
FIG. 2 is a block diagram illustrating a schematic configuration of a storage node.

As illustrated in FIG. 2, the storage node 10 includes a central processing unit (CPU) 21, a communication device 22 for host, and a communication device 23 for a block storage service, which are connected to each other via an internal network 20, and a memory 24 connected to the CPU 21. The storage node 10 includes one or more CPUs 21, one or more communication devices 22 for host, one or more communication devices 23 for a block storage service, and one or more memories 24.

When the storage node 10 is the physical server device, the CPU 21, the communication device 22 for host, the communication device 23 for a block storage service, and the memory 24 are implemented by physical devices, and when the storage node 10 is the virtual server device, the CPU 21, the communication device 22 for host, the communication device 23 for a block storage service, and the memory 24 are implemented as virtual devices.

The CPU 21 is a processor that controls an operation of the entire storage node 10. The memory 24 is implemented by a volatile semiconductor memory such as a static random access memory (RAM) (SRAM) or a dynamic RAM (DRAM), and is used for temporarily storing various programs and necessary data. When at least one or more CPUs 21 execute the program stored in the memory 24, various processing of the entire storage node 10, which will be described later, is executed.

The communication device 22 for host is an interface for the storage node 10 to communicate with the host device 3, another storage node 10 or the cloud control device 5 via the network 2, and is implemented by, for example, a network interface card (NIC) or the like. The communication device 22 for host executes protocol control during the communication with the host device 3, the other storage node 10, or the cloud control device 5.

The communication device 23 for a block storage service is an interface for the storage node 10 to communicate with the storage device 12 in the block storage providing service unit 13 via the network 14 for a block storage providing service, and is implemented by, for example, an NIC or the like similarly to the communication device 22 for host. The communication device 23 for a block storage service executes protocol control during the communication with the storage device 12.

The communication device 22 for host and the communication device 23 for a block storage service may be physically different communication devices or may be physically the same and logically separated communication devices. Further, the communication device 22 for host and the communication device 23 for a block storage service may be physically and logically the same communication device.

As illustrated in FIG. 1, the storage node 10 is collectively managed together with other one or a plurality of storage nodes 10 in one group called a cluster 15. In an example of FIG. 1, only one cluster 15 is set in the computer providing service unit 11, but a plurality of clusters 15 may be set in the computer providing service unit 11. The cluster 15 may be referred to as a distributed storage system.

The storage device 12 is implemented by one or a plurality of large-capacity non-volatile storage devices such as a serial attached small computer system interface (SCSI) (SAS) solid state drive (SSD), a non-volatile memory express (NVMe) SSD, an SAS hard disk drive, and a serial advanced technology attachment (ATA) (SATA) hard disk drive. The storage device 12 provides a physical or logical storage area for reading and writing data in response to the I/O request from the host device 3

The cloud control device 5 is a general-purpose computer device having a function of a system administrator to control the computer providing service unit 11 and the block storage providing service unit 13 in the cloud system 4. The cloud control device 5 executes addition, deletion, configuration change, or the like of the storage node 10 and the cluster 15 in the computer providing service unit 11 and the storage device 12 in the block storage providing service unit 13 via the network 2 in response to an operation of the system administrator. The cloud control device 5 may be a physical computer device or a virtual computer device such as a virtual machine. Further, the cloud control device 5 may be incorporated in the cloud system 4.

(2) Flows of Various Processing in Storage System (2-1) Programs and Information Stored in Memory of Storage Node Next, flows of various processing in the storage system 1 will be described. In this case, first, software and information stored in the memory 24 (FIG. 2) of the storage node 10 in relation to the various processing will be described with reference to FIGS. 3 to 7.

Figure 3:
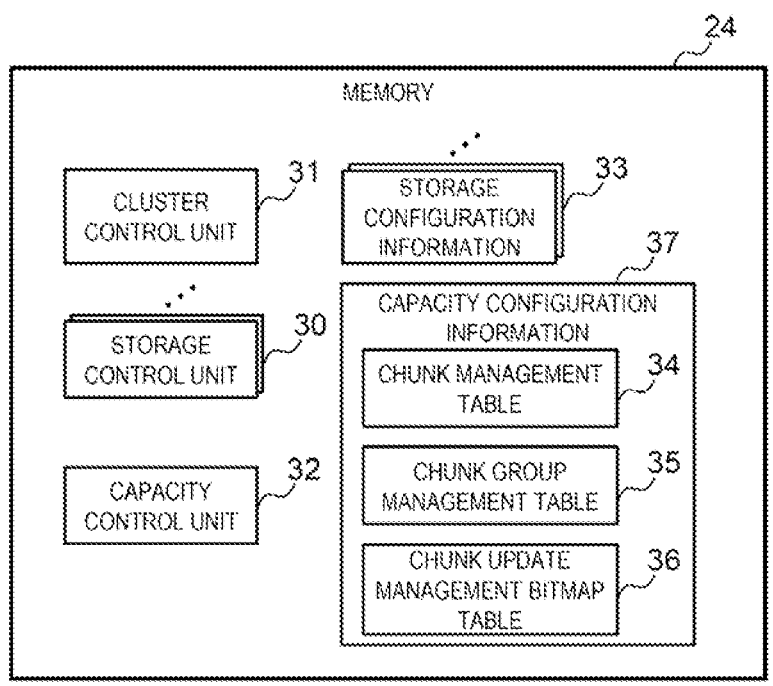
FIG. 3 is a block diagram illustrating software and information stored in a memory of the storage node.

As illustrated in FIG. 3, in the memory 24 of the storage node 10, a plurality of storage control units 30, a cluster control unit 31, and a capacity control unit 32 are stored as software, and a plurality of pieces of storage configuration information 33 provided corresponding to the storage control units 30, and capacity configuration information 37 including a chunk management table 34, a chunk group management table 35, and a chunk update management bitmap table 36 are stored as configuration information.

The storage control unit 30 is software that functions as a storage controller for an SDS. The storage control unit 30 has a function of receiving the I/O request from the host device 3 (FIG. 1) and requesting the capacity control unit 32 to read and write data from and to the corresponding storage device 12 (FIG. 1). The storage control unit 30 may be called a storage control program.

Figure 8:
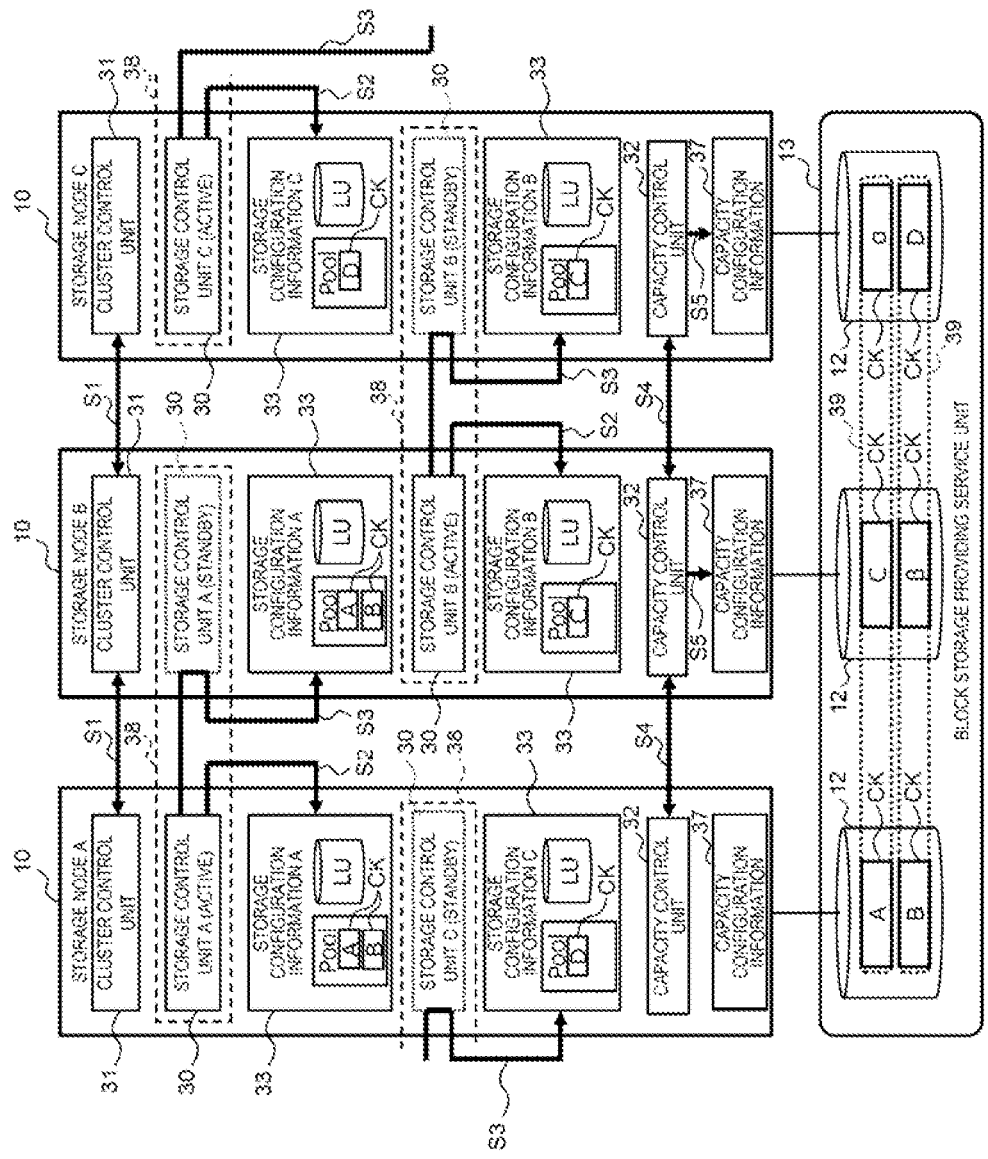
FIG. 8 is a block diagram illustrating a configuration of a cloud and an operation of the storage node in a normal state in this storage system.

In the case of the present embodiment, as illustrated in FIG. 8, the storage control unit 30 implemented in the storage node 10 is managed as one group (hereinafter, referred to as a redundancy group) 38 for redundancy together with one or a plurality of other storage control units 30 implemented in other storage nodes 10 different from each other.

FIG. 8 illustrates a case in which the redundancy group 38 includes two storage control units 30, and the following description will proceed assuming that the redundancy group 38 includes two storage control units 30, but the redundancy group 38 may include three or more storage control units 30.

In the redundancy group 38, at least one storage control unit 30 is set to a state of being capable of receiving the I/O request from the host device 3 (a state of an active system, hereinafter, referred to as an active mode), and the remaining storage control unit 30 is set to a state of not receiving the I/O request from the host device 3 (a state of a standby system, hereinafter, referred to as a standby mode).

Therefore, the redundancy group 38 including two storage control units 30 has either a configuration in which both of the two storage control units 30 are set to the active mode (an active-active configuration) or a configuration in which one storage control unit 30 is set to the active mode and the other storage control unit 30 is set to the standby mode (an active-passive configuration).

In the redundancy group 38 having the active-passive configuration, when a failure occurs in the storage control unit 30 set to the active mode or in the storage node 10 in which the storage control unit 30 operates, or when such a storage node 10 is removed (the storage node 10 is reduced), the state of the storage control unit 30 previously set to the standby mode is switched to the active mode. Accordingly, when the storage control unit 30 set to the active mode cannot operate, I/O processing executed by the storage control unit 30 can be taken over by the storage control unit 30 previously set to the standby mode (a failover function).

In order to implement such a failover function, the storage control unit 30 belonging to the same redundancy group 38 always stores the storage configuration information 33 having the same contents. The storage configuration information 33 is information necessary for the storage control unit to execute processing related to various functions such as a capacity virtualization function, a hierarchical storage control function of moving data with a high access frequency to a storage area having a higher response speed, a deduplication function of deleting redundant data from the stored data, a compression function of compressing and storing data, a snapshot function of storing a state of data at a certain time point, and a remote copy function of copying data to a remote location synchronously or asynchronously for a disaster countermeasure.

When the storage configuration information 33 of the storage control unit 30 in the active mode constituting the redundancy group 38 is updated, a difference between the storage configuration information 33 before and after the update is transferred as difference data to the other storage control unit 30 constituting the redundancy group 38, and the storage configuration information 33 stored by the other storage control unit 30 is updated by the other storage control unit 30 based on the difference data. Accordingly, the storage configuration information 33 stored by the respective storage control units 30 constituting the redundancy group 38 is always maintained in a synchronized state.

As described above, since the two storage control units 30 constituting the redundancy group 38 always store the storage configuration information 33 having the same content, even when a failure occurs in the storage control unit 30 set to the active mode or in the storage node 10 in which the storage control unit 30 operates, or when such a storage node 10 is removed, processing previously executed by the storage control unit 30 can be immediately taken over by another storage control unit 30 in the same redundancy group 38 as the storage control unit 30.

The cluster control unit 31 is software having a function of managing and operating states of the respective storage nodes 10 constituting the cluster 15 (FIG. 1) and the respective storage devices 12 allocated to these storage nodes 10. The cluster control unit 31 manages and operates activation of the storage control unit 30 and the capacity control unit 32, and an operation mode (the active mode or the standby mode, which will be described later) of the storage control unit 30.

Further, the cluster control unit 31 has a function of monitoring a communication status with each other, and when a failure occurs in the other storage node 10 due to some reason such as power interruption or network interruption, detecting the failure and notifying the other cluster control unit 31 of the failure. Examples of a state of the "failure of the storage node" include a state in which a failure occurs in a system disk in which software necessary for operating an operating system (OS) implemented in the storage node 10 is stored, and a state in which an interface provided by the cloud system 4 indicates a failure of the storage node 10.

In addition, the cluster control unit 31 also has a function of transferring the I/O request provided from the host device 3 to the cluster control unit 31 of the corresponding other storage node 10 via the network 14 for a block storage providing service, and delivering the I/O request transferred from the cluster control unit 31 of the other storage node 10 to the storage control unit 30 of the corresponding redundancy group 38.

In practice, in the present embodiment, as illustrated in FIG. 8, one or a plurality of virtual logical volumes (hereinafter, referred to as virtual volumes) LU corresponding to the redundancy group 38 are defined for each redundancy group 38, and these virtual volumes LU are provided to the host device 3 as storage areas for reading and writing data.

In the case of the present embodiment, one or a plurality of pools ("Pool" in FIG. 8) are defined for each redundancy group 38. The pool is a storage area obtained by virtualizing the physical storage area provided by the storage device 12, and a virtual storage area in the virtual volume LU and the physical storage area in the storage device are associated with each other through this pool. A correspondence between the physical storage area in the storage device 12 and a virtual storage area in the pool, and a correspondence between the virtual storage area in the pool and the virtual storage area in the virtual volume LU are managed as the storage configuration information 33 described above.

When reading and writing data from and to a desired virtual volume LU, the host device 3 transmits, to any storage node 10 in the corresponding cluster 15, the I/O request that designates an identifier (LUN: Logical Unit Number) of the virtual volume LU of a read and write destination of the data, an address of the read and write destination of the data in the virtual volume LU, and a data length of the data.

Thus, the cluster control unit 31 of the storage node 10 that receives the I/O request transfers, via the network 14 for a block storage providing service, the I/O request to the cluster control unit 31 of the storage node 10 in which the storage control units 30 of the redundancy group 38 associated with the virtual volume LU serving as a read and write target designated in the I/O request are disposed.

The cluster control unit 31 of the storage node 10 that receives the I/O request delivers the I/O request to the storage control units 30 of the redundancy group 38 associated with the virtual volume LU designated as the read and write destination in the I/O request. When the I/O request is a write request, the storage control unit 30, which is set to the active mode, of the storage control units 30 to which the I/O request is delivered dynamically allocates, through the pool, the physical storage area of the storage device 12 to an address position designated as a write destination of the data in the virtual volume LU designated as the write destination of the data in the I/O request, and then requests the capacity control unit 32 to write the data in the physical storage area.

As a means for executing such a series of processing, the cluster control unit 31 of the storage node 10 shares information indicating which storage node 10 the respective storage control units 30 present in the cluster 15 belong to, which redundancy group 38 the respective storage control units 30 belong to, and whether the operation mode is set to either the active mode or the standby mode, and executes processing for the I/O request from the host device 3 as described above by using the information.

As illustrated in FIG. 8, the capacity control unit 32 is software having a function of providing the physical storage area provided by the storage device 12 allocated to the own storage node 10 to the storage control unit 30 in units having a predetermined size called a chunk CK. The storage control unit 30 collectively manages the chunks CK provided from the capacity control unit 32 as the pool described above, and dynamically allocates the chunks CK in the pool to the virtual volume LU. Accordingly, the virtual storage area in the virtual volume LU is associated with the physical storage area in the storage device 12 in units of the chunk CK via the pool.

The capacity control unit 32 also has a function of dividing the data requested to be written from the storage control unit 30 to the storage device 12 into a plurality of pieces of partial data, generating erasure correction codes (Erasure Coding) from these pieces of partial data, and storing the plurality of pieces of partial data and the erasure correction codes in the chunks CK in the storage devices 12 different from each other, or restoring, by using the remaining partial data and the erasure correction codes, partial data that cannot be read out when some pieces of partial data cannot be read out due to a failure or the like.

The capacity control unit 32 manages, as a chunk group 39, a plurality of chunks CK in which such partial data and the erasure correction code generated from one piece of data are stored. FIG. 8 illustrates an example in which the chunk group 39 includes three chunks CK, and in this case, original data is divided into two pieces of partial data ("A" and "C", or "B" and "D" in FIG. 8) and stored in different chunks CK in the chunk group 39, respectively, and the erasure correction codes ("α" and "β" in FIG. 8) generated from these two pieces of partial data are stored in the remaining chunks CK of the chunk group 39.

In order to implement such a data restoration function, the capacity control unit 32 of the storage node 10 always stores the capacity configuration information 37 having the same content. The capacity configuration information 37 is information necessary for the capacity control unit 32 to execute processing related to a function of providing a usable area to the storage control unit 30 and a function of restoring data as described above. The capacity configuration information 37 includes the chunk management table 34, the chunk group management table 35, and the chunk update management bitmap table 36 as illustrated in FIG. 3.

When the capacity configuration information 37 is updated, a difference between the capacity configuration information 37 before and after the update is transferred as difference data to the capacity control unit 32 in the other storage node 10, and the capacity control unit 32 of the storage node 10 updates, based on the difference data, the capacity configuration information 37 stored by the capacity control unit 32. Accordingly, the capacity configuration information 37 stored in the capacity control unit 32 of the storage node 10 is always maintained in a synchronized state.

FIG. 4 illustrates the chunk management table 34 that constitutes a part of the capacity configuration information 37. The chunk management table 34 is a table used for managing the chunks CK present in the cluster 15 (FIG. 1), and includes a chunk number column 34A, a belonging node number column 34B, a storage device number column 34C, a storage device offset column 34D, and a capacity column 34E, as illustrated in FIG. 4. In the chunk management table 34, one record (one row) corresponds to one chunk CK present in the cluster 15.

The chunk number column 34A stores an identification number (a chunk number) unique to the chunk CK in the cluster 15, which is assigned to the corresponding chunk CK. The storage device number column 34C stores an identification number (a storage device number) unique to the storage device 12 in the cluster 15, which is assigned to the storage device 12 that provides the chunk CK, and the belonging node number column 34B stores an identification number (a node number) unique to the storage node 10 in the cluster 15, which is assigned to the storage node 10 to which the storage device 12 is allocated.

Further, the storage device offset column 34D stores a start address of the corresponding chunk CK in the storage area provided by the corresponding storage device 12, and the capacity column 34E stores a capacity of the chunk CK.

Therefore, in the case of an example of FIG. 4, it is indicated that the chunk CK to which a chunk number of "0" is assigned is a chunk having a capacity of "0x10000" starting from an address of "0x00000" in the storage device 12 having a storage device number of "0" allocated to the storage node 10 having a node number of "0", for example.

FIG. 5 illustrates the chunk group management table 35 that constitutes a part of the capacity configuration information 37. The chunk group management table 35 is a table used for managing the chunk group 39 (FIG. 8) present in the cluster 15, and includes a chunk group number column 35A and a plurality of chunk number columns 35B, as illustrated in FIG. 5. In the chunk group management table 35, one record (one row) corresponds to one chunk group 39 defined in the cluster 15.

The chunk group number column 35A stores an identification number (a chunk group number) unique to the chunk group 39 in the cluster 15, which is assigned to the corresponding chunk group 39. The chunk number column 35B stores chunk numbers of different chunks CK constituting the corresponding chunk group 39.

Therefore, in the case of an example of FIG. 5, it is indicated that the chunk group 39 to which a chunk group number of "0" is assigned includes a chunk CK having a chunk number of "0", a chunk CK having a chunk number of "4", and a chunk CK having a chunk number of "6".

FIG. 6 illustrates the chunk update management bitmap table 36 that constitutes a part of the capacity configuration information 37. The chunk update management bitmap table 36 is a table used for managing, when data is written to the chunk CK or data stored in the chunk CK is updated while the chunk CK cannot be accessed due to a failure or other reasons, which place in the chunk CK the data is written to or the data stored in which place is updated.

As illustrated in FIG. 6, the chunk update management bitmap table 36 includes a chunk number column 36A and an update management bitmap column 36B. In the chunk update management bitmap table 36, one record (one row) corresponds to one chunk CK, and records are provided corresponding to all the chunks CK present in the cluster 15.

The chunk number column 36A stores the chunk number of the corresponding chunk CK. The update management bitmap column 36B stores an update management bitmap associated with the chunk CK. Therefore, in the case of an example of FIG. 6, it is indicated that an update management bitmap of a chunk CK having a chunk number of "0" is "0011000001 . . . ".

Figure 7:
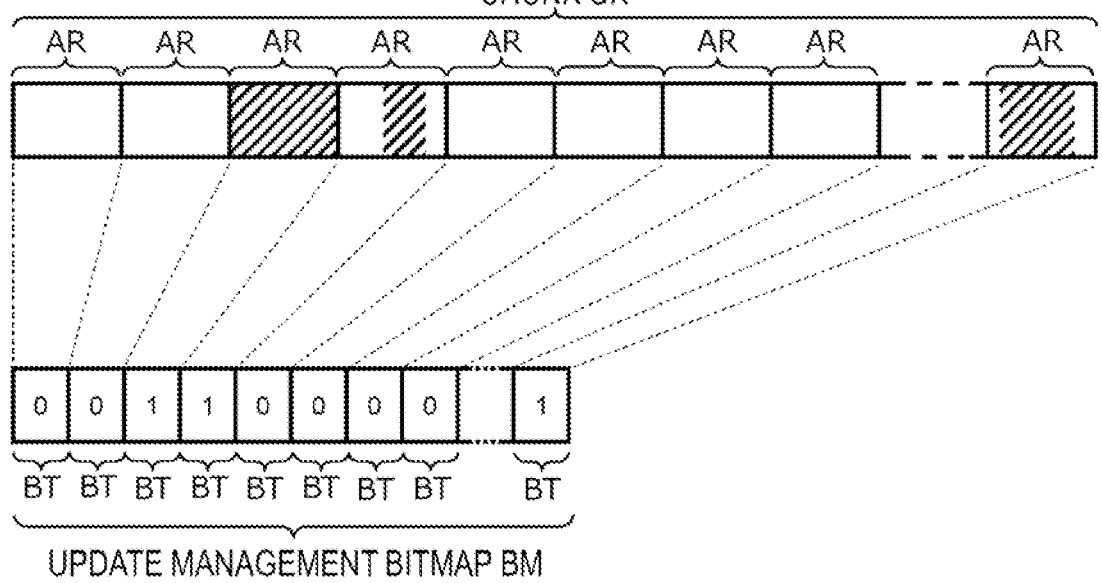
FIG. 7 is a conceptual diagram illustrating an update management bitmap.

Here, the update management bitmap will be described. As illustrated in FIG. 7, an update management bitmap BM is a bitmap including a plurality of update management bits BT respectively associated with partial areas AR when the chunk CK is divided into a plurality of partial areas AR of a predetermined size (for example, 256 KB).

In the update management bitmap BM, all the update management bits BT are initially set to "0". While the chunk CK corresponding to the update management bitmap BM cannot be accessed due to a failure or the like, when data write to the chunk CK or an update of data stored in the chunk CK is executed, the update management bit BT corresponding to all the partial areas AR to which the data is written or the stored data is updated is set to "1".

Accordingly, when the chunk CK can be accessed thereafter, a state of the chunk CK can be updated by storing the data from the host device 3 in the partial area AR set to "1" in the update management bitmap BM, or updating the data stored in the partial area AR to an updated data.

The data to be newly stored in the partial area AR or the updated data can be rebuilt by using the data and the erasure correction code (parity) stored in the other chunk CK constituting the chunk group 39 to which the chunk CK belongs.

(2-2) Flows of Various Processing (2-2-1) Normal State of Storage System

FIG. 8 illustrates a normal state of the storage system 1. In FIG. 8, a "storage node A", a "storage node B", and a "storage node C" indicate storage nodes 10, respectively, a "storage control unit A (active)", a "storage control unit B (active)", and a "storage control unit C (active)" indicate the storage control units 30 in the active mode, respectively, and a "storage control unit A (standby)", a "storage control unit B (standby)", and a "storage control unit C (standby)" indicate the storage control units 30 in the standby mode, respectively.

FIG. 8 illustrates an example in which the "storage control unit A (active)" operating on the "storage node A" and the "storage control unit A (standby)" operating on the "storage node B" constitute the redundancy group 38, the "storage control unit B (active)" operating on the "storage node B" and the "storage control unit B (standby)" operating on the "storage node C" constitute the redundancy group 38, and the "storage control unit C (active)" operating on the "storage node C" and the "storage control unit C (standby)" operating on the "storage node A" constitute the redundancy group 38. Further, here, it is assumed that configurations of the respective redundancy groups 38 created by the redundancy of the storage control units 30 are active-standby configurations.

At this time, the cluster control unit 31 of the storage node 10 monitors states of the storage node 10 in which the cluster control unit 31 is implemented (hereinafter, the storage node 10 is referred to as the own storage node 10) and the storage device 12 allocated to the storage node 10, and an operation status of the other control software, and shares the information (S1).

As described above, when the storage configuration information 33 of the storage control unit 30 in the active mode is updated (S2), the difference between the storage configuration information 33 before and after the update is transferred as difference data to the other storage control unit 30 constituting the same redundancy group 38 as that of the storage control unit 30, and the storage configuration information 33 stored by the storage control unit 30 is updated by the other storage control unit 30 based on the difference data (S3).

Further, when the capacity configuration information 37 is updated by the capacity control unit 32, the difference between the capacity configuration information 37 before and after the update is directly or indirectly transferred as difference data to the capacity control units 32 of all other storage nodes 10 (S4), and the capacity configuration information 37 stored by the capacity control units 32 is updated by the capacity control units 32 based on the difference data (S5). FIG. 8 illustrates an example in which the capacity configuration information 37 of the "storage node A" is updated.

(2-2-2) Flow of Degeneration Processing when Failure Occurs in Storage Node

Figure 9:
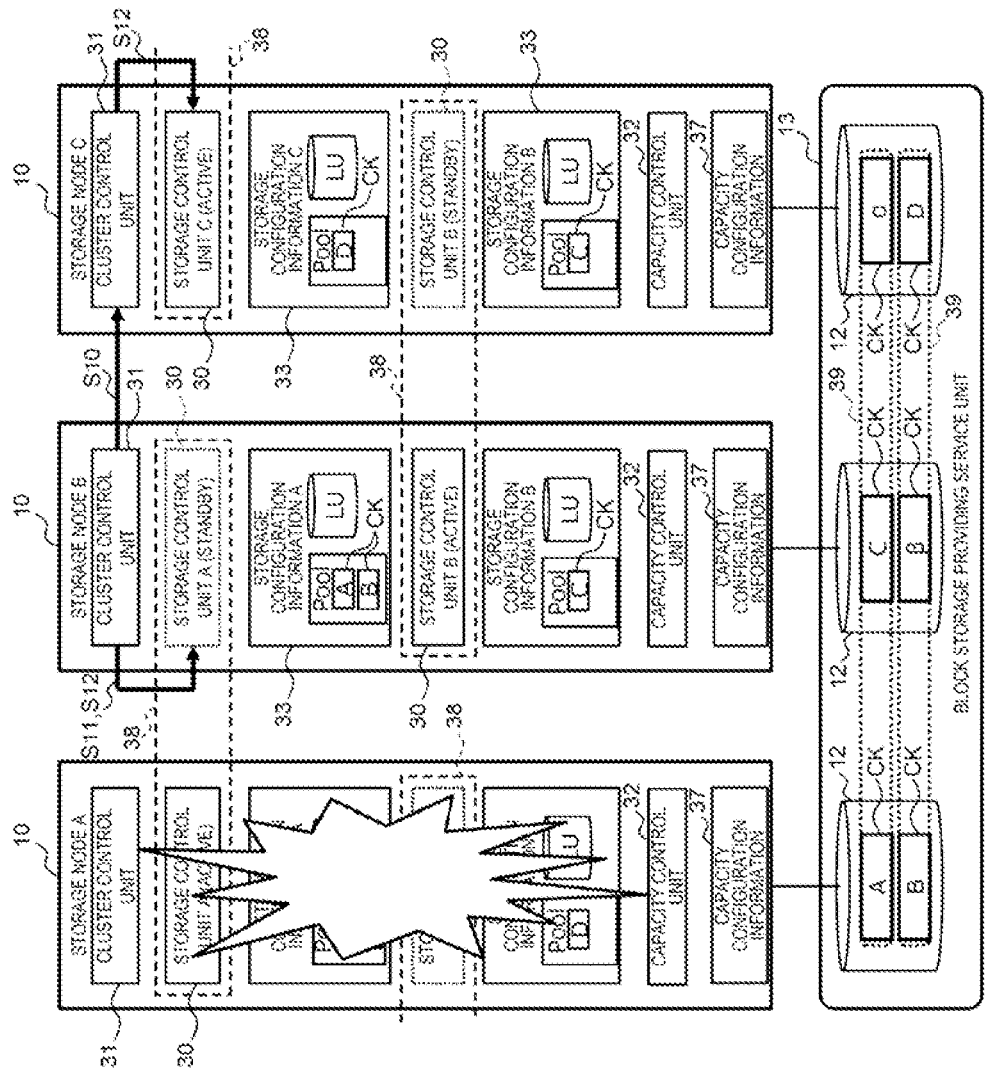
FIG. 9 is a block diagram illustrating a degenerate operation when a failure occurs in this storage system.

Next, flows of a series of processing when a failure occurs in any of the storage nodes 10 constituting the cluster 15 will be described. Here, as illustrated in FIG. 9, a flow of processing (hereinafter, referred to as degeneration processing) in a case in which a failure occurs in the "storage node A" and the "storage node A" becomes inaccessible will be described.

In this case, the cluster control unit 31 of the "storage node B" connected to the cluster control unit 31 of the "storage node A" detects the failure of the "storage node A". Then, the cluster control unit 31 of the "storage node B" transmits a notification indicating that the failure of the "storage node A" is detected to the cluster control unit 31 of the "storage node C" (S10).

The cluster control unit 31 of the "storage node C" that receives the notification notifies another adjacent (communicable) storage node other than the "storage node B" that transmits the notification that the failure occurs in the "storage node A". However, in the example of FIG. 9, since there is no other adjacent storage node 10 other than the "storage node B", the "storage node C" does not execute the notification.

Then, as described above, the cluster control units 31 of the "storage node B" and the "storage node C", which recognize the failure of the "storage node A", execute processing of switching the operation modes of the storage control units 30 in the standby mode in the own storage nodes 10 constituting the same redundancy groups 38 as the storage control units 30 disposed in the "storage node A" in which a failure occurs to the active mode. In the case of the example of FIG. 9, the cluster control unit 31 of the "storage node B" changes a state of the "storage control unit A (standby)" to the active mode (S11). Accordingly, I/O processing previously executed by the "storage control unit A (active)" is taken over by the "storage control unit B (standby)".

The cluster control units 31 of the "storage node B" and the "storage node C" which recognize the failure of the "storage node A" instruct the "storage control unit A (standby)" or the "storage control unit C (active)" in the own storage nodes 10 that constitutes the redundancy groups 38 together with the "storage control unit A (active)" or the "storage control unit C (standby)" disposed in the "storage node A" in which a failure occurs not to transfer the difference data to the "storage control unit A (active)" or the "storage control unit C (standby)" constituting the same redundancy groups 38 even when the storage configuration information 33 stored by the storage control unit 30 is updated (S11).

Figure 10:
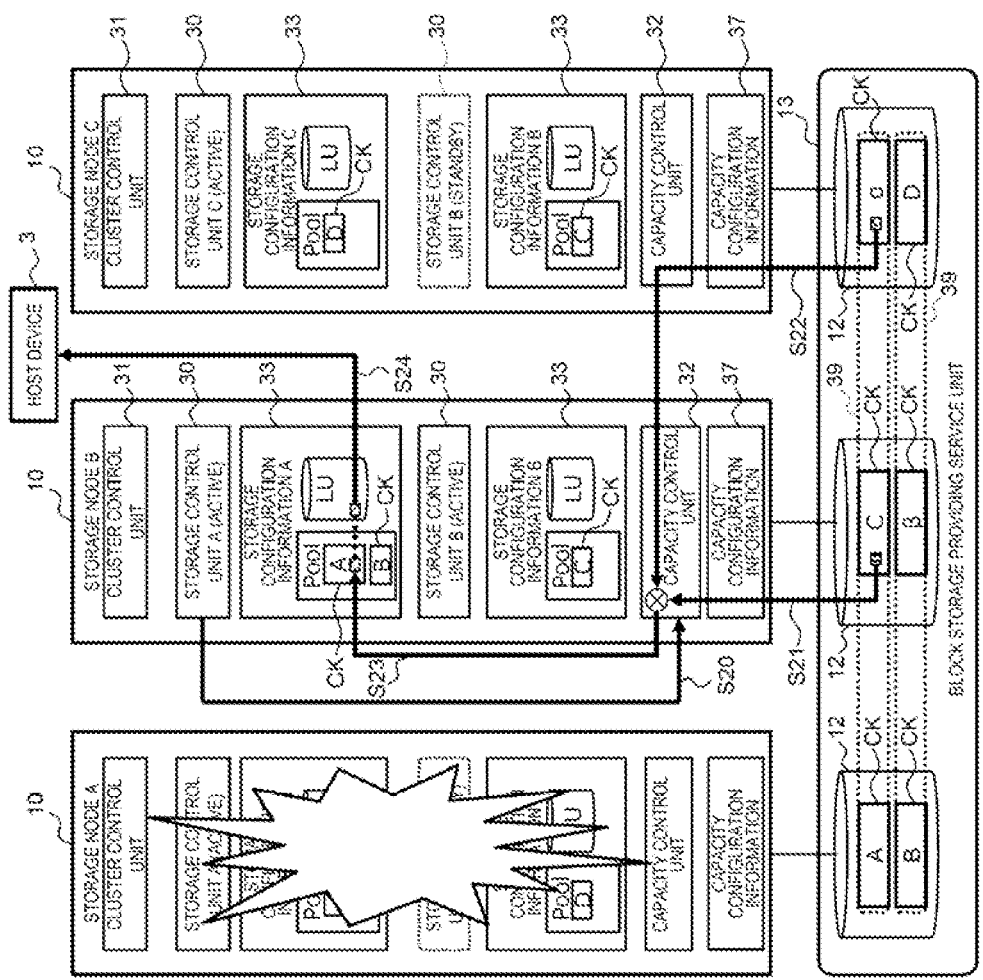
FIG. 10 is a block diagram illustrating a flow of read processing in a degeneration configuration of this storage system.

(2-2-3) Flow of Reading Data Present in Inaccessible Chunk in Degeneration Configuration FIG. 10 illustrates a flow of processing in a case in which the failure occurs in the "storage node A" as illustrated in FIG. 9, and the host device 3 gives a read request to the virtual volume LU associated with the "storage control unit A" in a state in which the degeneration processing as described above with reference to FIG. 9 is executed (a state of the degeneration configuration).

In this case, the "storage control unit A" activated in the "storage node B" processes the read request. Specifically, the "storage control unit A" issues the read request to the capacity control unit 32 with reference to "storage configuration information A" (S20). In the present embodiment, it is assumed that a read request for a "chunk A" is issued from the "storage control unit A" to the capacity control unit 32.

The capacity control unit 32 of the "storage node B" that receives the read request checks, with reference to the chunk management table 34 (FIG. 4) of the capacity configuration information 37, a location of a chunk (the "chunk A") in which read target data designated in the read request is stored. At this time, since the "chunk A" is the chunk CK provided by the storage device 12 allocated to the "storage node A" in which a failure occurs, the "chunk A" cannot be accessed.

Therefore, the capacity control unit 32 specifies, with reference to the chunk group management table 35 (FIG. 5) of the capacity configuration information 37, the chunks CK other than the "chunk A" constituting the chunk group 39 to which the "chunk A" belongs. Here, as illustrated in FIG. 10, it is assumed that the "chunk A" constitutes the chunk group 39 together with a "chunk C" and a "chunk α". Accordingly, in this example, the "chunk C" and the "chunk α" are specified as the chunks CK other than the "chunk A" constituting the chunk group 39 to which the "chunk A" belongs.

Then, the capacity control unit 32 specifies, with reference to the chunk management table 34, locations of the "chunk C" and the "chunk α" specified in this manner, and then reads data necessary for restoring the read target data from the "chunk C" and the "chunk α" (S21 and S22).

The capacity control unit 32 restores the read target data based on the read data, and transfers the restored data to the "storage control unit A" (S23). Thus, the "storage control unit A" transmits the restored read target data given by the capacity control unit 32 to the host device 3 that is a transmission source of the read request (S24).

Figure 11:
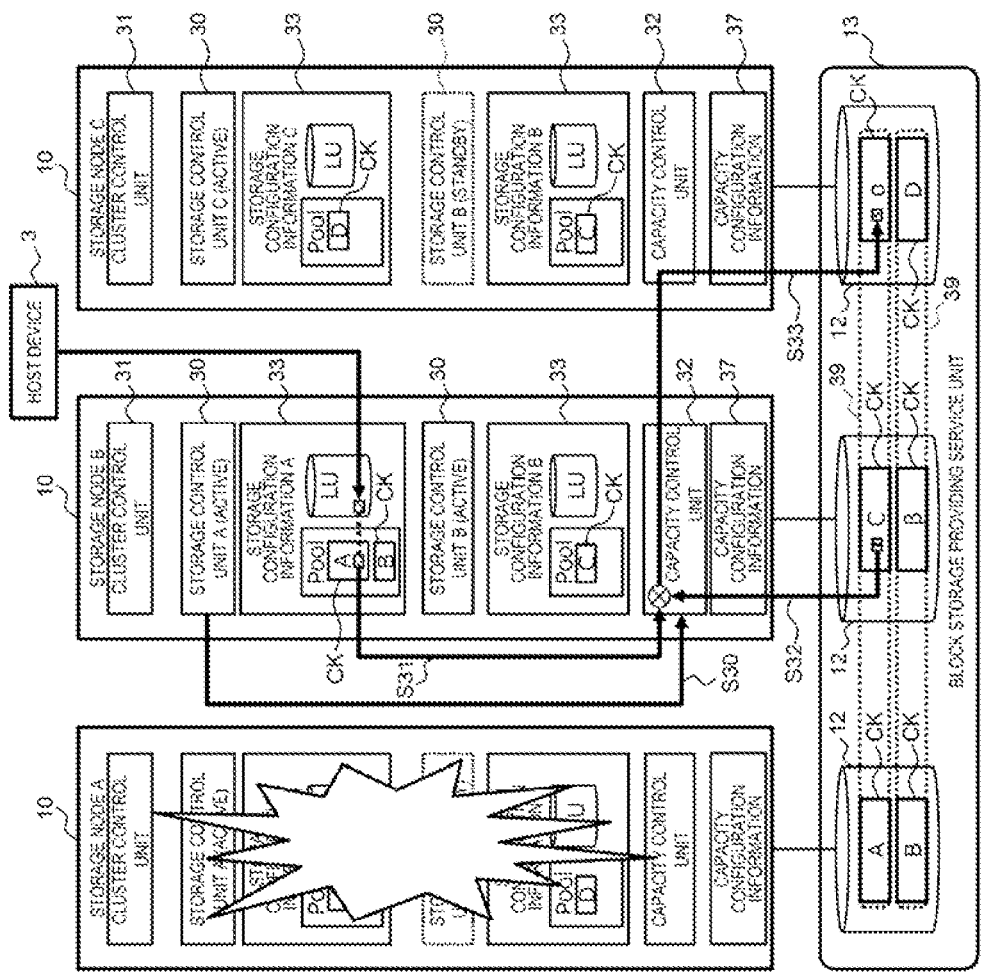
FIG. 11 is a block diagram illustrating a flow of write processing in the degeneration configuration of this storage system.

(2-2-4) Flow of Writing Data to Inaccessible Chunk in Degeneration Configuration FIG. 11 illustrates a flow of processing in a case in which the failure occurs in the "storage node A" as illustrated in FIG. 9, and the host device 3 gives a write request to the virtual volume LU associated with the "storage control unit A" in a state in which the degeneration processing as described above with reference to FIG. 9 is executed.

In this case, the "storage control unit A" activated in the "storage node B" processes the write request from the host device 3. Specifically, the "storage control unit A" issues the write request to the capacity control unit 32 with reference to the "storage configuration information A" (S30). In the present embodiment, it is assumed that a write request for the "chunk A" is issued from the "storage control unit A" to the capacity control unit 32. The "storage control unit A" transfers write data to the capacity control unit 32 (S31).

The capacity control unit 32 of the "storage node B" that receives the write request checks, with reference to the chunk management table 34 of the capacity configuration information 37, a location of a chunk CK (the "chunk A") serving as a storage destination of the write data designated in the write request. At this time, since the "chunk A" is the chunk provided by the storage device 12 allocated to the "storage node A" in which a failure occurs, the "chunk A" cannot be accessed.

Therefore, the capacity control unit 32 specifies, with reference to the chunk group management table 35 of the capacity configuration information 37, the chunks other than the "chunk A" constituting the chunk group 39 to which the "chunk A" belongs. Here, as illustrated in FIG. 11, it is assumed that the "chunk A" constitutes the chunk group 39 together with the "chunk C" and the "chunk α". Accordingly, in this example, the "chunk C" and the "chunk α" are specified as the chunks other than the "chunk A" constituting the chunk group 39 to which the "chunk A" belongs.

Then, the capacity control unit 32 specifies locations of the specified "chunk C" and "chunk α" with reference to the chunk management table 34. The capacity control unit 32 reads data necessary for generating a new erasure correction code by using the write data from the "chunk C" (S32), and generates the new erasure correction code by using the read data and the write data. The capacity control unit 32 overwrites the generated erasure correction code in the "chunk α" (S33).

Further, the capacity control unit 32 sets "1" for all update management bits BT (FIG. 7) corresponding to the partial areas AR (FIG. 7) to which the write data should be written in the update management bitmap BM (FIG. 7) of the "chunk A" stored in the chunk update management bitmap table 36 (FIG. 6) of the capacity configuration information 37. Accordingly, the series of processing ends.

(2-2-5) Flow of Creating Alternative Storage Node of Failure Occurred Storage Node Next, a flow until a new storage node 10 serving as an alternative of the storage node 10 in which a failure occurs is created and the created storage node 10 can be used as a part of the cluster 15 will be described with reference to FIGS. 12 to 14. Here, it is assumed that the failure occurs in the "storage node A" and the degeneration processing is executed as described above with reference to FIG. 9.

Figure 12:
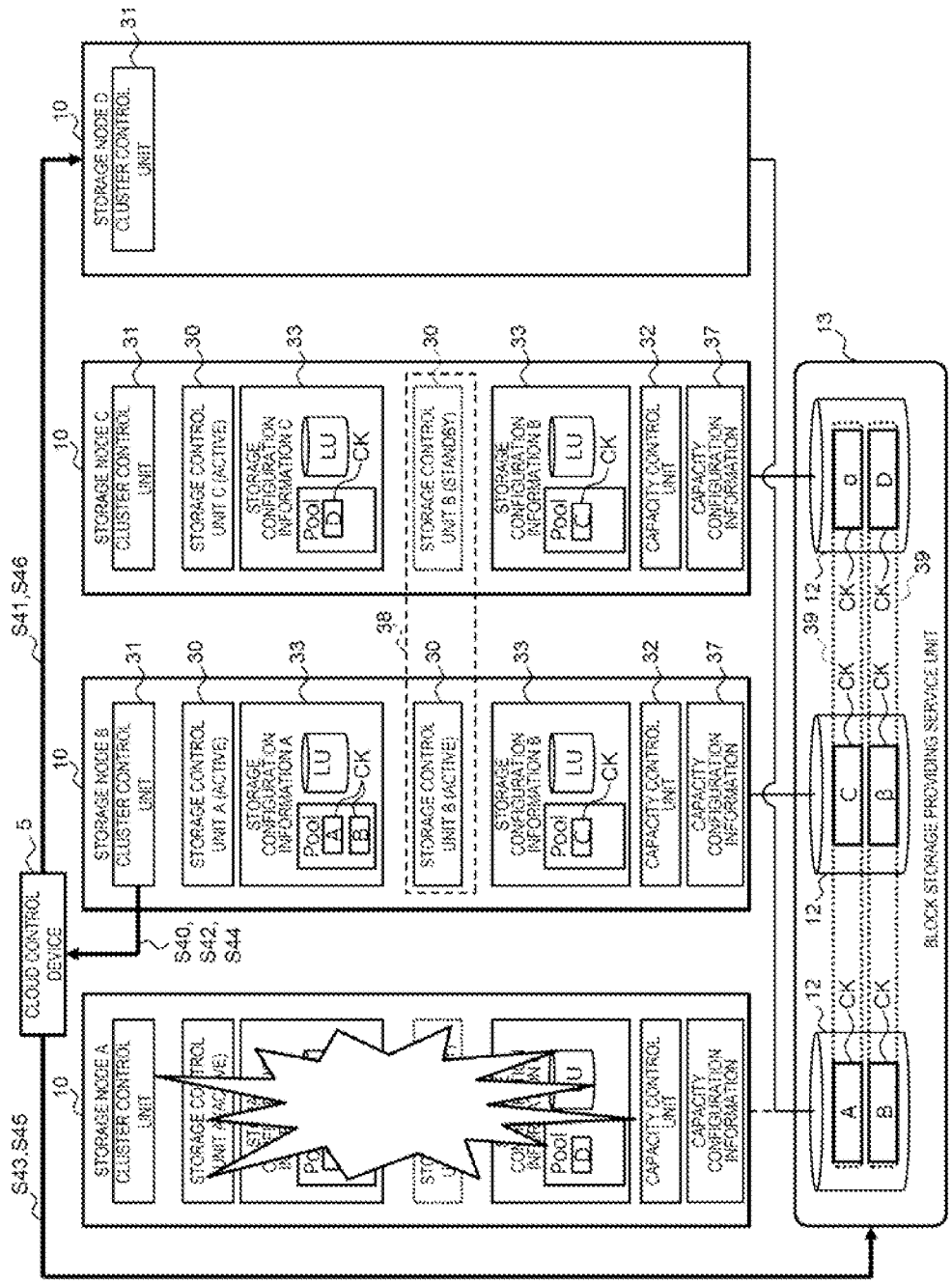
FIG. 12 is a block diagram illustrating alternative storage node creation processing.

First, as illustrated in FIG. 12, the cluster control unit 31 of the "storage node B" that detects that the failure occurs in the "storage node A" requests the cloud control device 5 to prepare the new storage node (hereinafter, referred to as an alternative storage node) 10 instead of the "storage node A" (S40). Upon receiving the request, the cloud control device 5 creates the new storage node 10 (a "storage node D" in FIG. 12) in the cluster 15 (S41).

Specifically, when the storage node 10 is a physical storage device, the cloud control device 5 incorporates an existing physical storage device into the cluster 15, and when the storage node 10 is a virtual storage device, the cloud control device 5 creates a new virtual storage device and incorporates the new virtual storage device into the cluster 15.

The cluster control unit 31 of the "storage node B" requests the cloud control device 5 to detach all of the storage devices 12 allocated to the "storage node A" in which a failure occurs (S42). Thus, the cloud control device 5 that receives the request detaches all of the storage devices 12 previously allocated to the "storage node A" (S43).

Further, the cluster control unit 31 of the "storage node B" requests the cloud control device 5 to attach all the storage devices 12 detached from the "storage node A" in step S43 to the "storage node D" newly created in step S41 (S44). Thus, the cloud control device 5 that receives the request attaches all the storage devices 12 previously allocated to the "storage node A" to the "storage node D" (S45).

Meanwhile, when the "storage node D" is added to the cluster 15 as described above, the cluster control unit 31 in the "storage node D" is activated by the cloud control device 5 (S46). Then, the activated cluster control unit 31 of the "storage node D" starts to share, with the cluster control units 31 of the other storage nodes 10, configuration information (the storage configuration information 33 and the capacity configuration information 37) and the operation status of the control software (the storage control unit 30 and the capacity control unit 32) of the respective storage nodes 10 including the own storage node 10 in the cluster 15.

Then, the cluster control units 31 of the respective storage nodes 10, which share the configuration information and the operation status of the control software of the respective storage nodes 10 in the cluster 15 as described above, start processing of returning the degraded redundancy group to a normal state. Here, it is assumed that the cluster control unit 31 of the "storage node B" determines, based on CPU loads and free memory capacities of the "storage node B", the "storage node C", and the "storage node D", to dispose the "storage control unit A (active)" and the "storage control unit C (standby)" in the "storage node D", and to change the currently active "storage control unit A" of the "storage node B" to the standby mode.

Figure 13:
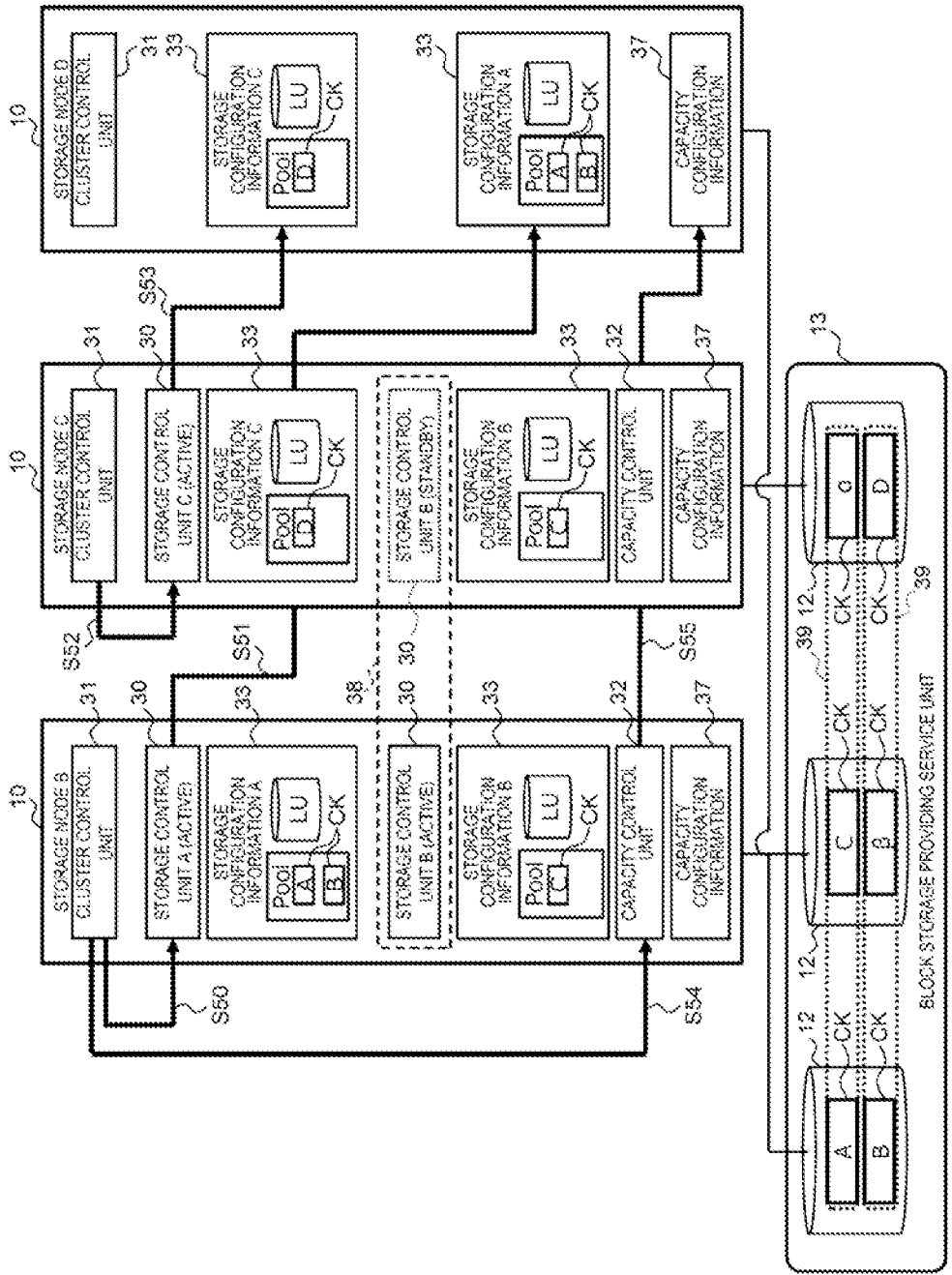
FIG. 13 is a block diagram illustrating the alternative storage node creation processing.

Based on the determination result, the cluster control unit 31 of the "storage node B" instructs the "storage control unit A" to copy the "storage configuration information A" to the "storage node D" as illustrated in FIG. 13 (S50). Thus, the "storage control unit A" transfers the "storage configuration information A" to the "storage node D" according to this instruction (S51). Then, the cluster control unit 31 of the "storage node D" that receives the "storage configuration information A" stores the "storage configuration information A" in the memory 24 (FIG. 2) of the own storage node 10.

After copying the "storage configuration information A" to the "storage node D", the "storage control unit A" of the "storage node B" starts to transfer a difference between the "storage configuration information A" before and after an update to the "storage node D" as difference data each time the "storage configuration information A" is updated. As a result, a copy result of the "storage configuration information A" in the "storage node D" is updated based on the difference data, whereby synchronization with the copy result of the "storage configuration information A" in the "storage node B" is started.

Meanwhile, the cluster control unit 31 of the "storage node C" instructs, based on the determination result described above, the "storage control unit C" to copy "storage configuration information C" to the "storage node D" (S52). Thus, the "storage control unit C" transfers the "storage configuration information C" to the "storage node D" according to this instruction (S53). Then, the cluster control unit 31 of the "storage node D" that receives the "storage configuration information C" stores the "storage configuration information C" in the memory 24 of the own storage node 10.

After copying the "storage configuration information C" to the "storage node D", the "storage control unit C" of the "storage node C" starts to transfer a difference between the "storage configuration information C" before and after an update to the "storage node D" as difference data each time the "storage configuration information C" is updated. Thus, a copy result of the "storage configuration information C" in the "storage node D" is updated based on the difference data, whereby synchronization between the "storage configuration information C" in the "storage node C" and the copy result of the "storage configuration information C" in the "storage node D" is started.

Further, the cluster control unit 31 of the "storage node B" instructs the capacity control unit 32 of the own storage node 10 to copy the capacity configuration information 37 to the "storage node D" (S54). Thus, the capacity control unit 32 that receives this instruction transfers the capacity configuration information 37 stored in the capacity control unit 32 itself to the "storage node D" according to this instruction (S55). Then, the cluster control unit 31 of the "storage node D" that receives the capacity configuration information 37 stores the capacity configuration information 37 in the memory 24 of the own storage node 10.

Figure 14:
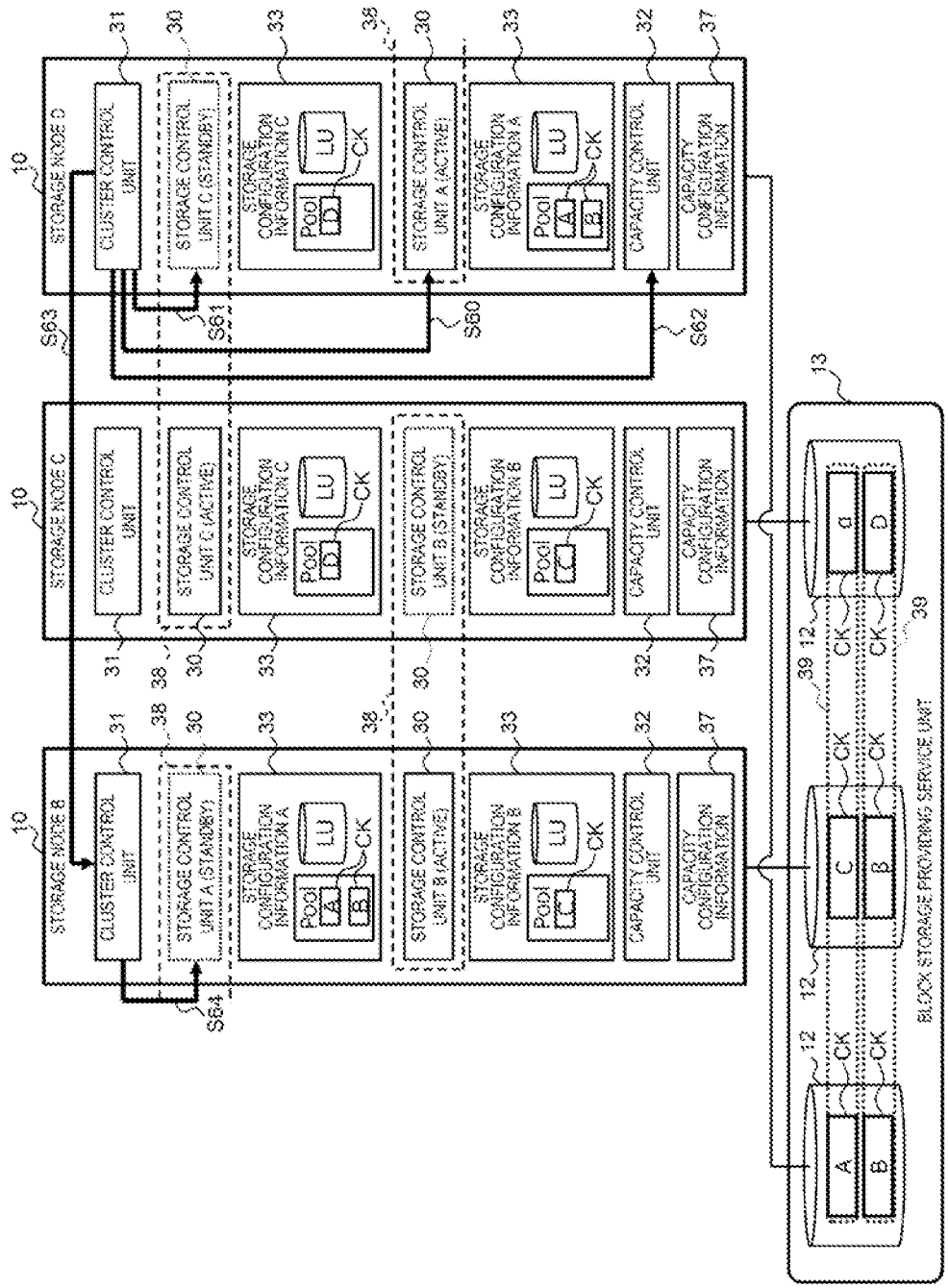
FIG. 14 is a block diagram illustrating the alternative storage node creation processing.

As described above, when the copying of the "storage configuration information A", the "storage configuration information C", and the capacity configuration information 37 stored by the "storage node A" in which a failure occurs to the "storage node D" is completed, the cluster control unit 31 of the "storage node D" activates the storage control unit 30 and the capacity control unit 32 in the own storage node 10, as illustrated in FIG. 14. Specifically, the cluster control unit 31 activates the "storage control unit A" in the own storage node 10 in the active mode (S60), activates the "storage control unit C" in the standby mode (S61), and further activates the capacity control unit 32 (S62).

The cluster control unit 31 of the "storage node D" instructs the cluster control unit 31 of the "storage node B" to switch the operation mode of the "storage control unit A" in the "storage node B", which constitutes the redundancy group 38 together with the "storage control unit A" activated in step S60, to the standby mode (S63). Thus, the cluster control unit 31 of the "storage node B" that receives this instruction switches the "storage node A" in the own storage node 10 to the standby mode (S64).

In addition, the cluster control unit 31 of the "storage node D" updates, in accordance with a current state, information stored by the cluster control unit 31 itself, such as which storage node 10 the respective storage control units 30 present in the cluster 15 belong to, which redundancy group 38 the respective storage control units 30 belong to, and whether the operation mode is set to either the active mode or the standby mode.

The cluster control unit 31 transmits a difference between the information before and after the update as difference data to the cluster control unit 31 of the "storage node B" and the cluster control unit 31 of the "storage node C" via the cluster control unit 31. Accordingly, the information stored by the cluster control unit 31 of the "storage node B" and the information stored by the cluster control unit 31 of the "storage node C" are updated to contents matching the current state.

By the processing described above, the newly created "storage node D" can be used as a part of the cluster 15.

(2-2-6) Flow of Rebuild Processing

Figure 15:
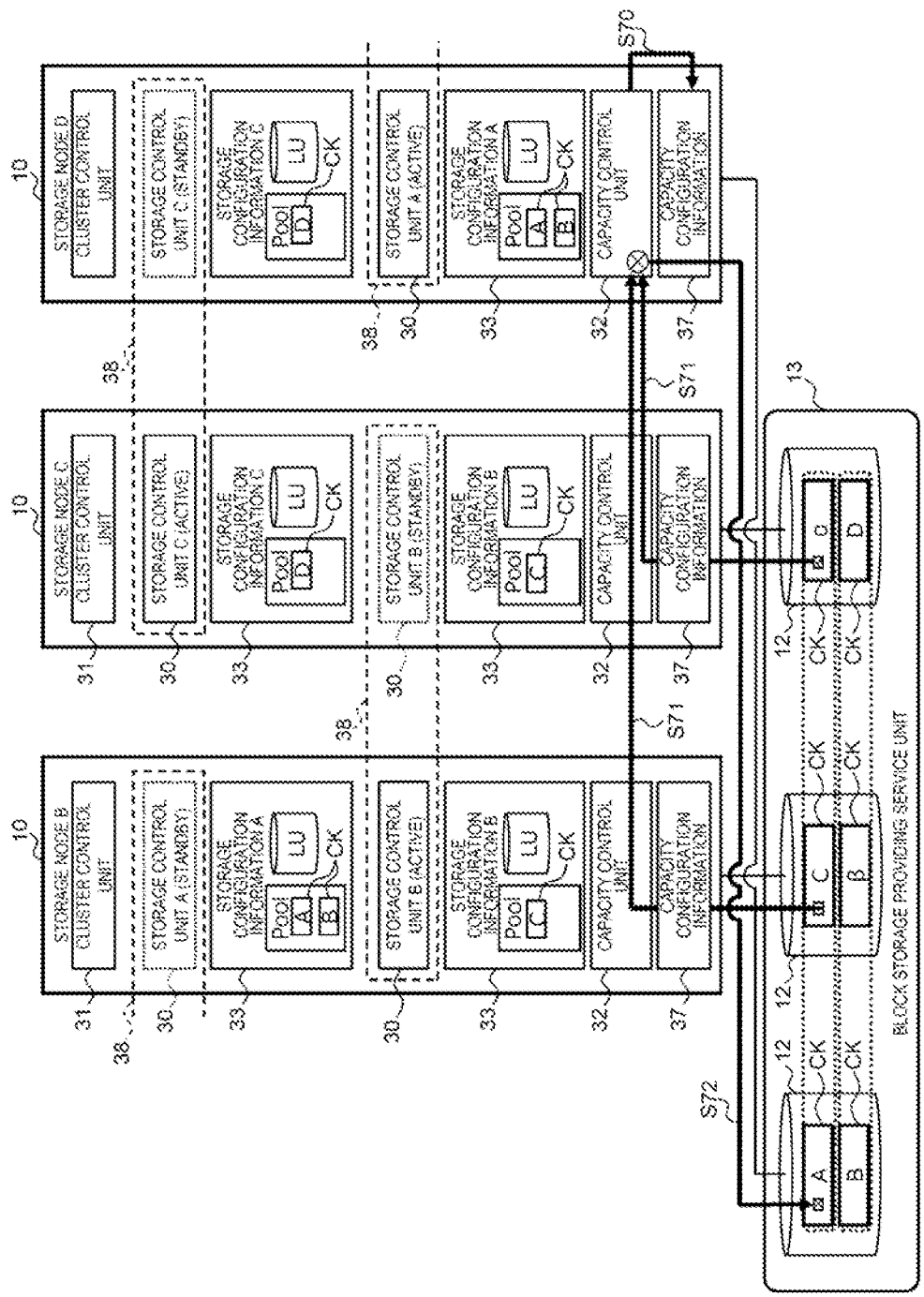
FIG. 15 is a block diagram illustrating rebuild processing.

FIG. 15 illustrates a flow of rebuild processing executed by the capacity control unit 32 of the new storage node 10 (the "storage node D" in FIG. 15) created by the series of processing described above with reference to FIGS. 12 to 14.

After the end of FIG. 14, the capacity control unit 32 of the "storage node D" is started by the cluster control unit 31 of the "storage node D", and first, with reference to the capacity configuration information 37 in the own storage node 10, specifies all the chunks CK that need to be rebuilt in the storage device 12 allocated to the own storage node 10, and specifies, for each specified chunk CK, chunks CK other than the chunk CK that constitutes the same chunk group 39 as the chunk CK (S70).

Specifically, the capacity control unit 32 acquires a list of the chunks CK present in the storage device 12 allocated to the own storage node 10 (hereinafter, these chunks CK are referred to as chunks CK belonging to the own storage node 10), with reference to chunk management table 34 (FIG. 4) of the capacity configuration information 37 in the own storage node 10.

The capacity control unit 32 checks whether there is a chunk CK including the partial area AR (FIG. 7) that needs to be rebuilt among the chunks CK belonging to the own storage node 10, with reference to the chunk update management bitmap table 36 (FIG. 6) of the capacity configuration information 37.

Here, the "chunk CK that needs to be rebuilt" refers to a chunk CK including the partial area AR in which data write is executed by the host device 3 during a period from occurrence of the failure in the "storage node A" to the present. A chunk including "1" in the update management bitmap BM (FIG. 7) stored in the update management bitmap column 36B of the chunk update management bitmap table 36 corresponds to such a chunk CK. In the following, such a chunk CK will be referred to as a rebuild target chunk CK.

When the capacity control unit 32 checks that such a chunk CK is present, with reference to the chunk group management table 35 (FIG. 5) of the capacity configuration information 37, the capacity control unit 32 specifies, for each rebuild target chunk CK, all the chunks CK other than the rebuild target chunk CK constituting the chunk group 39 to which the rebuild target chunk CK belongs. For example, in the examples of FIGS. 5 and 6, the chunk CK having a chunk number of "0" is the rebuild target chunk CK, and a "chunk 4" and a "chunk 6" are specified as the chunks CK other than the rebuild target chunk CK constituting the same chunk group 39.

The capacity control unit 32 reads, from the corresponding storage devices 12, via the capacity control unit 32 of the other "storage node B" and the capacity control unit 32 of the "storage node C", all data required to rebuild the partial area AR that needs to be rebuilt (the partial area AR of which the corresponding update management bit BT is "1" in the update management bitmap BM, hereinafter, referred to as rebuild target partial area AR) in the rebuild target chunk CK from each specified chunk CK (S71). Then, the capacity control unit 32 restores the data of the rebuild target partial area AR based on the read data, and stores the restored data in the rebuild target partial area AR (S72).

By the processing described above, the cluster 15 recovers from the degenerate operation, and returns to the normal state before the failure occurs in the "storage node A".

(2-3) Specific Processing Contents of Each Software Related to Degeneration Configuration Recovery Next, specific processing contents of the cluster control unit 31 and the capacity control unit 32 related to a recovery operation from the degeneration configuration of the storage node 10 described above will be described. In the following, "software" such as the cluster control unit 31 and the capacity control unit 32 will be described as processing subjects of various types of processing, but in practice, it is needless to say that the CPU 21 (FIG. 2) of the storage node 10 executes the processing based on the "software".

(2-3-1) Alternative Storage Node Creation Processing

Figure 16:
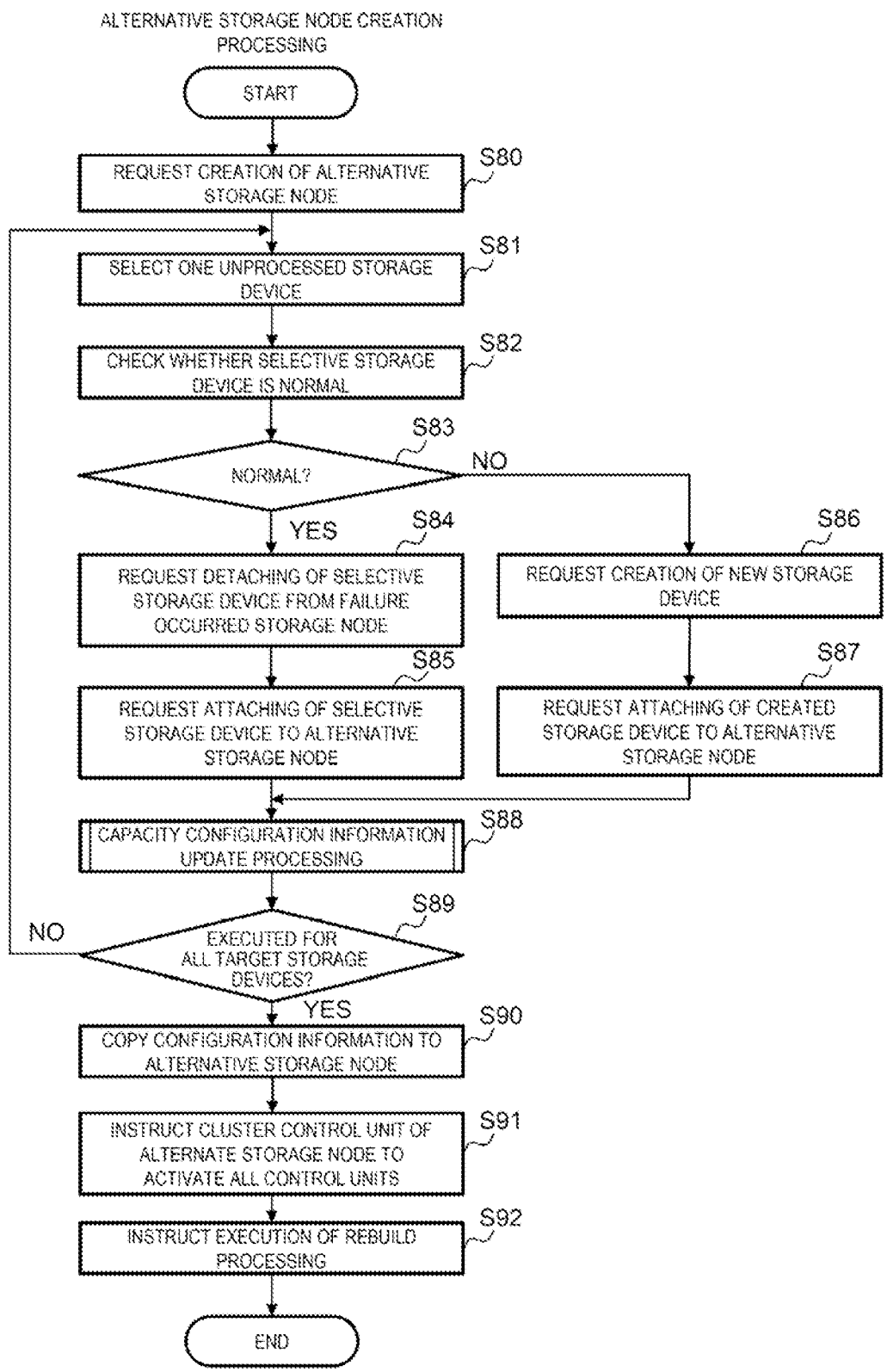
FIG. 16 is a flowchart illustrating a processing procedure of the alternative storage node creation processing.

FIG. 16 illustrates a flow of a series of processing (hereinafter, referred to as alternative storage node creation processing) executed when the cluster 15 recovers from the degeneration configuration to a normal configuration by creating the storage node serving as an alternative (hereinafter, referred to as the alternative storage node) 10 of the storage node 10 in which a failure occurs as described above with reference to FIGS. 12 to 15.

This alternative storage node creation processing is started after the cluster control unit 31 of any storage node 10 detects a failure of the other storage node 10 and the cluster 15 has the degeneration configuration described above with reference to FIG. 9.

Then, the cluster control unit (hereinafter, referred to as a failure detection cluster control unit) 31 that detects the failure of the other storage node 10 connected to a communication device first requests the cloud control device 5 to create the alternative storage node 10 of the storage node in which a failure occurs (hereinafter, referred to as a failure occurred storage node) 10 (S80).

Subsequently, the failure detection cluster control unit 31 selects one storage device 12 allocated to the failure occurred storage node 10 among the storage devices 12 provided by the block storage providing service unit 13 (FIG. 1) (S81), and requests the cloud control device 5 to check a current state of the selected storage device (hereinafter, referred to as a selective storage device) 12 (S82).

Then, as a result of the request in step S82, the failure detection cluster control unit 31 determines whether an answer indicating that the selective storage device 12 is normal is obtained from the cloud control device 5 (S83).

When the failure detection cluster control unit 31 obtains a positive result in this determination, the failure detection cluster control unit 31 requests the cloud control device 5 to detach the selective storage device 12 from the failure occurred storage node 10 (S84), and requests the cloud control device 5 to attach the selective storage device 12 to the alternative storage node 10 (S85).

In contrast, when the failure detection cluster control unit 31 obtains a negative result in step S83, the failure detection cluster control unit 31 requests the cloud control device 5 to create a new storage device 12 (S86), and requests the cloud control device 5 to attach the storage device 12 to the alternative storage node 10 (S87).

Next, the failure detection cluster control unit 31 updates the capacity configuration information 37 in the own storage node 10 according to processing contents of the processing of steps S84 and S85, or the processing of steps S86 and S87 (S88).

Thereafter, the failure detection cluster control unit 31 determines whether the processing of steps S82 to S88 is executed for all the storage devices 12 allocated to the failure occurred storage node 10 (S89). When the failure detection cluster control unit 31 obtains a negative result in this determination, the failure detection cluster control unit 31 returns to step S81, and then repeats the processing of steps S81 to S89 until a positive result is obtained in step S89 while sequentially switching the storage device 12 selected in step S81 to another storage device 12 for which the processing of step S82 and subsequent steps is not executed.

When the failure detection cluster control unit 31 eventually obtains a positive result in step S89 by executing the processing of steps S82 to S88 for all the storage devices 12 allocated to the failure occurred storage node 10, the failure detection cluster control unit 31 executes processing for copying the storage configuration information 33 and the capacity configuration information 37 stored by the failure occurred storage node 10 to the alternative storage node 10 (S90).

Specifically, when the storage configuration information 33 to be stored in the storage control unit 30 disposed in the alternative storage node 10 is present in the own storage node 10, the failure detection cluster control unit 31 transfers the storage configuration information 33 to the cluster control unit 31 of the alternative storage node 10. At this time, the failure detection cluster control unit 31 also transfers the capacity configuration information 37 to the cluster control unit 31 of the alternative storage node 10. Thus, the cluster control unit 31 of the alternative storage node 10 stores the storage configuration information 33 and the capacity configuration information 37 transferred from the failure detection cluster control unit 31 in the memory 24 (FIG. 2), and manages the storage configuration information 33 and the capacity configuration information 37.

When the storage configuration information 33 to be stored in the storage control unit 30 disposed in the alternative storage node 10 is not present in the own storage node 10, the failure detection cluster control unit 31 specifies the storage node 10 that stores the storage configuration information 33, and instructs the cluster control unit 31 of the storage node 10 to transfer the storage configuration information 33 to the alternative storage node 10. At this time, the failure detection cluster control unit 31 transfers the capacity configuration information 37 to the cluster control unit 31 of the alternative storage node 10.

Thus, the cluster control unit 31 that receives such an instruction transfers the corresponding storage configuration information 33 in the own storage node 10 to the alternative storage node 10. The cluster control unit 31 of the alternative storage node 10 stores the capacity configuration information 37 transferred from the failure detection cluster control unit 31 and the storage configuration information 33 transferred from the other storage node 10 in the memory 24, and manages the capacity configuration information 37 and the storage configuration information 33.

Subsequently, the failure detection cluster control unit 31 instructs the cluster control unit of the alternate storage node 10 to activate all the storage control units 30 and the capacity control unit 32 (S91). At this time, the failure detection cluster control unit 31 also designates the operation mode (the active mode or the standby mode) of each storage control unit 30 activated in the alternative storage node 10.

Next, the failure detection cluster control unit 31 instructs the cluster control unit 31 of the alternative storage node 10 to execute the rebuild processing (892). As a result, the cluster control unit 31 of the alternative storage node 10 that receives the instruction instructs the capacity control unit 32 in the own storage node 10 to execute the rebuild processing, which will be described later with reference to FIG. 18.

Thereafter, the failure detection cluster control unit 31 ends the series of alternative storage node creation processing.

(2-3-2) Capacity Configuration Information Update Processing

FIG. 17 illustrates a flow of a series of processing (hereinafter, referred to as capacity configuration information update processing) executed by the failure detection cluster control unit 31 in step S88 of the alternative storage node creation processing described above with reference to FIG. 16.

When the failure detection cluster control unit 31 proceeds to step S88 of the alternative storage node creation processing, the failure detection cluster control unit 31 starts the capacity configuration information update processing illustrated in FIG. 17, and first selects one chunk CK from the respective chunks CK (FIG. 6) in the selective storage device 12 at that time (S100), and specifies a record corresponding to the chunk (hereinafter, referred to as a selective chunk) CK selected in step S100 from the respective records (rows) of the chunk management table 34 (FIG. 4), based on the chunk number of the selective chunk CK (S101).

Subsequently, the failure detection cluster control unit 31 rewrites a storage node number stored in the belonging node number column 34B (FIG. 4) in the record specified in step S101 to a storage node number of the alternative storage node 10 (S102).

Next, the failure detection cluster control unit 31 obtains the negative result in step S83 of FIG. 16 for the selective storage device 12, and as a result, determines whether the new storage device 12 is created instead of the selective storage device 12 in step S86 (S103). When the failure detection cluster control unit 31 obtains a negative result in this determination, the failure detection cluster control unit 31 proceeds to step S106.

In contrast, when the failure detection cluster control unit 31 obtains a positive result in the determination of step S103, the failure detection cluster control unit 31 rewrites the storage device number stored in the storage device number column 34C (FIG. 4) of the record specified in step S101 in the chunk management table 34 to a storage device number of the storage device (hereinafter, referred to as an alternative selective storage device) created as an alternative for the selective storage device 12 in step S86 of the alternative storage node creation processing (S104).

The failure detection cluster control unit 31 specifies a record corresponding to the selective chunk among the respective records (rows) of the chunk update management bitmap table 36 (FIG. 6) based on the chunk number of the selective chunk, and sets values of all the update management bits BT (FIG. 7) of the update management bitmap BM (FIG. 7) stored in the update management bitmap column 36B (FIG. 6) of the specified record to "1" (S105).

Further, the failure detection cluster control unit 31 determines whether the processing of steps S101 to S105 is executed for all the storage devices 12 allocated to the failure occurred storage node 10 (S106). The failure detection cluster control unit 31 returns to step S100 when a negative result is obtained in the determination of step S106, and thereafter repeats the processing of steps S100 to S106 until a positive result is obtained in step S106.

When the failure detection cluster control unit 31 eventually obtains a positive result in step S106 by executing the processing of steps S101 to S105 for all the storage devices 12 allocated to the failure occurred storage node 10, the failure detection cluster control unit 31 ends the capacity configuration information update processing.

(2-3-3) Rebuild Processing

FIG. 18 illustrates a flow of a series of processing executed by the capacity control unit 32 of the alternative storage node 10 related to the rebuild processing described above with reference to FIG. 15. When an instruction to execute the rebuild processing is given from the cluster control unit 31 of the alternative storage node 10 in step S92 of FIG. 16, the capacity control unit 32 of the alternative storage node 10 starts the rebuild processing illustrated in FIG. 18.

The capacity control unit 32 first specifies, with reference to the chunk management table 34 of the capacity configuration information 37, all the chunks CK (FIG. 6) in the respective storage devices 12 to be rebuilt, which are allocated to the alternative storage node 10 (the "storage node D") newly created instead of the "storage node A", and selects, from the specified chunks CK, one chunk CK for which processing of step S111 and subsequent steps is not executed (S110).

Subsequently, the capacity control unit 32 acquires the update management bitmap BM (FIG. 7) of the chunk (hereinafter, referred to as the selective chunk) CK selected in step S110 from the chunk update management bitmap table 36 (FIG. 6) (S111), and selects, from the acquired update management bitmap BM, one update management bit BT (FIG. 7) for which processing of step S113 and subsequent steps is not executed (3112).

Next, the capacity control unit 32 determines whether a value of the update management bit (hereinafter, referred to as a selective update management bit) BT selected in step S112 is "1" (S113). The capacity control unit 32 returns to step S112 when a negative result is obtained in this determination, and thereafter, executes the processing of step S112 and subsequent steps as described above.

In contrast, when the capacity control unit 32 obtains a positive result in the determination of step S113, the capacity control unit 32 restores data of the partial area AR (FIG. 7) in the selective chunk CK corresponding to the selective update management bit BT (S114). Specifically, the capacity control unit 32 specifies, with reference to the chunk group management table 35 (FIG. 5), the other chunks CK constituting the same chunk group 39 (FIG. 8) as the selective chunk CK, and requests the capacity control unit 32 of the corresponding other storage node 10 to read and transfer data from the partial area AR corresponding to the selective update management bit BT in the specified chunks CK. Then, the capacity control unit 32 restores, based on the data acquired in this way, data to be stored in the partial area AR corresponding to the selective update management bit BT in the selective chunk CK.

Subsequently, the capacity control unit 32 writes the restored data in the partial area AR in the selective chunk CK in the corresponding storage device 12 (S115), and then updates the value of the selective update management bit BT to "0" (S116).

Further, the capacity control unit 32 determines whether the processing of steps S113 to S116 is executed for all the update management bits BT in the update management bitmap BM corresponding to the selective chunk CK (S117). When a negative result is obtained in this determination, the capacity control unit 32 returns to step S112, and then repeats the processing of steps S112 to S117 until a positive result is obtained in step S117 while sequentially switching the update management bit BT selected in step S112 to another update management bit BT for which the processing of step S113 and subsequent steps is not executed.

When the capacity control unit 32 eventually obtains a positive result in step S117 by executing the processing of steps S113 to S116 for all the update management bits BT in the update management bitmap BM corresponding to the selective chunk CK, the capacity control unit 32 determines whether the processing of steps S111 to S117 is executed for all the chunks CK in the respective storage devices 12 to be rebuilt allocated to the alternative storage node 10 (S118).

When a negative result is obtained in this determination, the capacity control unit 32 returns to step S110, and thereafter repeats the processing of steps S110 to S118 until a positive result is obtained in step S118 while sequentially switching the chunk CK selected in step S110 to another chunk CK for which processing of step S111 and subsequent steps is not executed.

When the capacity control unit 32 eventually obtains a positive result in step S118 by executing processing of steps S111 to S117 for all the chunks CK in the respective storage devices 12 to be rebuilt allocated to the alternative storage node 10, the capacity control unit 32 ends the rebuild processing.

(3) Effects of Present Embodiment

As described above, according to the storage system 1 of the present embodiment, the storage node instructs the cloud control device to create the new storage node (the alternative storage node) when the failure of the other storage node is detected, determines whether the storage device allocated to the storage node in which a failure occurs is failed, and requests the cloud control device to allocate the storage device allocated to the storage node in which a failure occurs to the new storage node when the storage device is determined to be not failed.

Therefore, according to the storage system 1, it is not necessary for a user to prepare spare computer resources or storage resources in advance when constructing the distributed storage system, and thus the storage system 1 can be constructed inexpensively from a user's point of view. It is not necessary to copy the data stored in the storage device 12 allocated to the storage node 10 in which a failure occurs to, for example, the storage device 12 allocated to the new storage node 10, and thus it is possible to quickly recover from the degeneration configuration when a failure occurs. Therefore, according to the storage system 1, it is possible to quickly recover from the degeneration configuration when a failure occurs while reducing a cost required for system construction.

(4) Other Embodiments

In the above embodiment, the alternative storage node creation processing described above with reference to FIG. 16 and the configuration information update processing described above with reference to FIG. 17 are executed by the storage node 10 that first detects the failure of the storage node 10 in which a failure occurs among the storage nodes 10 constituting the same cluster 15, but the invention is not limited thereto, and for example, one representative storage node (hereinafter, referred to as a representative storage node) 10 may be selected from the storage nodes 10 constituting the cluster 15, and the selected representative storage node 10 may execute the alternative storage node creation processing and the configuration information update processing.

In the above embodiment, the storage node 10 divides data into a plurality of pieces of partial data, generates erasure correction codes from these pieces of partial data, and stores the plurality of pieces of partial data and the erasure correction codes in the chunks CK in the storage devices 12 different from each other, but the invention is not limited thereto, and the same data may be stored (replicated) in a plurality of different storage devices. In this case, when new data or updated data stored in the storage device 12 allocated to the storage node 10 in which a failure occurs during the occurrence of the failure is restored to the storage device 12 allocated to the alternative storage node 10, the data stored in the other storage device 12 in which the same data is stored may be copied and restored as it is.

Further, in the above embodiment, the storage device 12 is a block storage device, but the invention is not limited thereto, and the invention can also be applied to a case in which the storage device 12 is a file storage device. In this case, the presence or absence of an update of data stored in the storage device 12 allocated to the storage node 10 in which a failure occurs during the occurrence of the failure and the presence or absence of newly written data may be checked in file units.

INDUSTRIAL APPLICABILITY

The invention can be widely applied to a storage system having various configurations for providing a storage area for a higher-level device.

What is claimed is:

1. A storage system for providing a storage area to a higher-level device, the storage system comprising:
   one or a plurality of storage devices provided in a cloud system, and configured to provide the storage area;
   a plurality of storage nodes provided in the cloud system, and configured to read and write data from and to the storage device allocated to the storage nodes themselves in response to a request from the higher-level device; and
   a cloud control device configured to control the cloud system,
   wherein the storage node is configured to;
      request the cloud control device to prepare a new storage node when a failure of another storage node is detected;
      determine whether the storage device allocated to the another storage node, in which a failure occurs, is failed; and
      request the cloud control device to allocate the storage device allocated to the another storage node, in which the failure occurs, to the new storage node when the storage device is determined to be not failed, and
   wherein the another storage node shares with remaining storage nodes storage configuration information, capacity configuration information, and operation status of control software such that the remaining storage nodes return a degraded redundancy group to a normal state.

2. The storage system according to claim 1, wherein the new storage node is configured to write data requested to be written to the storage device allocated to the another storage node in which the failure occurs during occurrence of the failure, to the storage device allocated to the new storage node.

3. The storage system according to claim 2, wherein the storage node is configured to
   request the cloud control device to prepare a new storage device when the storage device allocated to the another storage node in which the failure occurs is determined to be failed, and
   request the cloud control device to allocate the prepared new storage device to the new storage node, and
   the new storage node is configured to
      write data stored in the storage device determined to be failed to the new storage device.

4. The storage system according to claim 3, wherein the storage node is configured to
   generate an erasure correction code from the data stored in the storage device, and store the generated erasure correction code in the storage device different from the storage device in which the data is stored, and
   the new storage node is configured to restore, by using the erasure correction code, the data stored in the storage device determined to be failed, and write the restored data in the new storage device.

5. The storage system according to claim 4, wherein
   a write destination of the data requested to be written to the storage device allocated to the another storage node in which the failure occurs during occurrence of a failure in the storage device is stored by the storage node other than the storage node in which the failure occurs, and
   the new storage node is configured to
      write the restored data to the write destination stored by the storage node other than the another storage node in which the failure occurs.

6. The storage system according to claim 4, wherein the storage node is configured to
   divide the storage area provided by the storage device allocated to the storage node into chunks having a predetermined size and manage the chunks, and manage, as a chunk group, one of the chunks in a predetermined number of the storage devices allocated to the plurality of storage nodes, and
   store the data and the erasure correction code generated from the data separately in a plurality of the chunks constituting a same chunk group.

7. A failure handling method in a storage system for providing a storage area to a higher-level device,
   the storage system including:
      one or a plurality of storage devices provided in a cloud system, and configured to provide the storage area;
      a plurality of storage nodes provided in the cloud system, and configured to read and write data from and to the storage device allocated to the storage nodes themselves in response to a request from the higher-level device; and
      a cloud control device configured to control the cloud system, the failure handling method comprising:
      a first step of requesting, by the storage node, the cloud control device to prepare a new storage node when a failure of another storage node is detected;
      a second step of determining, by the storage node, whether the storage device allocated to the another storage node, in which the failure occurs, is failed; and
      a third step of requesting, by the storage node, the cloud control device to allocate the storage device allocated to the another storage node, in which the failure occurs, to the new storage node when the storage device is determined to be not failed,
   wherein the another storage node shares with remaining storage nodes storage configuration information, capacity configuration information, and operation status of control software such that the remaining storage nodes return a degraded redundancy group to a normal state.

8. The failure handling method according to claim 7, further comprising:
   a fourth step of writing, by the new storage node, data requested to be written to the storage device allocated to the another storage node in which the failure occurs during occurrence of a failure to the storage device allocated to the new storage node.

9. The failure handling method according to claim 8, wherein in the third step, the storage node
   requests the cloud control device to prepare a new storage device when the storage device allocated to the another storage node in which the failure occurs is determined to be failed, and
   requests the cloud control device to allocate the prepared new storage device to the new storage node, and in the fourth step, the new storage node writes data stored in the storage device determined to be failed to the new storage device.

10. The failure handling method according to claim 9, wherein the storage node generates an erasure correction code from the data stored in the storage device, and stores the generated erasure correction code in the storage device different from the storage device in which the data is stored, and in the fourth step, the new storage node restores, by using the erasure correction code, the data stored in the storage device determined to be failed, and write the restored data in the new storage device.

11. The failure handling method according to claim 10, wherein a write destination of the data requested to be written to the storage device allocated to the another storage node in which the failure occurs during occurrence of a failure in the storage device is stored by the storage node other than the another storage node in which the failure occurs, and in the fourth step, the new storage node writes the restored data to the write destination stored by the storage node other than the another storage node in which the failure occurs.

12. The failure handling method according to claim 10, wherein the storage node divides the storage area provided by the storage device allocated to the storage node into chunks having a predetermined size and manages the chunks, and manages, as a chunk group, one of the chunks in a predetermined number of the storage devices allocated to the plurality of storage nodes, and stores the data and the erasure correction code generated from the data separately in a plurality of the chunks constituting a same chunk group.

* * * * *